(12) United States Patent
Ravichandran et al.

(10) Patent No.: US 8,912,113 B2
(45) Date of Patent: Dec. 16, 2014

(54) COMPOSITIONS OF A METAL AMIDINE COMPLEX AND SECOND COMPOUND, COATING COMPOSITIONS COMPRISING SAME

(75) Inventors: Ramanathan Ravichandran, Suffern, NY (US); Robert Coughlin, Norwalk, CT (US); Bing Hsieh, Ridgefield, CT (US); Farouk Abi-Karam, Wilton, CT (US); John Florio, Norwalk, CT (US)

(73) Assignee: King Industries, Inc., Norwalk, CT (US)

( * ) Notice: Subject to any disclaimer, the term of this patent is extended or adjusted under 35 U.S.C. 154(b) by 125 days.

(21) Appl. No.: 13/411,924

(22) Filed: Mar. 5, 2012

(65) Prior Publication Data

US 2012/0225982 A1 Sep. 6, 2012

Related U.S. Application Data

(60) Provisional application No. 61/449,709, filed on Mar. 6, 2011.

(51) Int. Cl.
*B01J 31/38* (2006.01)
*C08L 63/00* (2006.01)
*C08L 63/02* (2006.01)

(52) U.S. Cl.
USPC ........... 502/167; 525/523; 525/533; 525/511; 524/196; 528/53; 528/54

(58) Field of Classification Search
USPC ........... 502/167; 525/523, 511, 533; 524/196; 528/53, 54
See application file for complete search history.

(56) References Cited

U.S. PATENT DOCUMENTS

| | | | |
|---|---|---|---|
| 3,639,345 A | 2/1972 | Whittemore et al. | |
| 3,784,690 A | 1/1974 | Gätzi | |
| 3,923,743 A | 12/1975 | Quiring et al. | |
| 3,984,382 A | 10/1976 | Parekh et al. | |
| 4,006,124 A * | 2/1977 | Welte et al. | 528/52 |
| 4,044,171 A | 8/1977 | Muller et al. | |
| 4,115,320 A | 9/1978 | Meyborg | |
| 4,413,079 A | 11/1983 | Disteldorf et al. | |
| 4,463,154 A | 7/1984 | Disteldorf et al. | |
| 4,483,798 A | 11/1984 | Disteldorf et al. | |
| 4,558,076 A | 12/1985 | Wright et al. | |
| 4,614,674 A | 9/1986 | Lauterbach | |
| 4,886,838 A | 12/1989 | Dewhurst | |
| 5,140,068 A | 8/1992 | Siebert et al. | |
| 5,401,824 A | 3/1995 | Clatty et al. | |
| 5,492,955 A | 2/1996 | Wamprecht et al. | |
| 5,670,441 A | 9/1997 | Foedde et al. | |
| 5,702,581 A | 12/1997 | Kerlin et al. | |
| 5,756,634 A | 5/1998 | Braunstein et al. | |
| 5,847,044 A | 12/1998 | Laas et al. | |
| 6,410,667 B1 | 6/2002 | Moren | |
| 6,907,152 B2 | 6/2005 | Takahashi et al. | |
| 7,485,729 B2 | 2/2009 | Hsieh et al. | |
| 8,088,846 B2 | 1/2012 | Hsieh et al. | |
| 2006/0036007 A1 | 2/2006 | Hsieh et al. | |
| 2012/0070569 A1 | 3/2012 | Hsieh et al. | |
| 2012/0313035 A1 * | 12/2012 | Williams et al. | 252/182.24 |

FOREIGN PATENT DOCUMENTS

| | | |
|---|---|---|
| DE | 23 12 391 C2 | 9/1974 |
| DE | 24 20 475 C2 | 11/1975 |
| DE | 25 02 934 C2 | 7/1976 |
| DE | 43 30 002 C1 | 3/1995 |
| DE | 19 532 294 A1 | 3/1997 |
| DE | 19 613 685 C1 | 9/1997 |
| DE | 19 618 825 A1 | 11/1997 |
| EP | 0 045 996 B1 | 3/1985 |
| EP | 0 045 998 B1 | 7/1985 |
| EP | 0 045 994 B1 | 10/1985 |
| EP | 0 109 602 B1 | 3/1987 |
| EP | 0 509 437 B1 | 1/1995 |
| EP | 0 639 598 B1 | 2/1995 |
| EP | 0 652 263 B1 | 5/1995 |
| EP | 0 669 353 B1 | 8/1995 |
| EP | 0 690 106 B1 | 1/1996 |
| EP | 0 810 245 A1 | 12/1997 |
| GB | 869988 | 6/1961 |
| GB | 890280 | 2/1962 |
| GB | 908949 | 10/1962 |
| GB | 1488631 | 10/1977 |
| JP | 08-041424 A | 2/1996 |
| JP | 09-176570 | 7/1997 |
| WO | WO 91/07452 A1 | 5/1991 |
| WO | WO 93/04102 A1 | 3/1993 |
| WO | WO 95/04093 A1 | 2/1995 |
| WO | WO 95/07377 A1 | 3/1995 |
| WO | WO 95/08579 A1 | 3/1995 |
| WO | WO 95/29007 A1 | 11/1995 |

(Continued)

OTHER PUBLICATIONS

Office Action mailed Nov. 29, 2012 for U.S. Appl. No. 13/303,862, filed Nov. 23, 2011.
Office Action mailed Jul. 1, 2013 for U.S. Appl. No. 13/303,862, filed Nov. 23, 2011.
Office Action mailed Mar. 11, 2014 for U.S. Appl. No. 13/303,862, filed Nov. 23, 2011.
Antoon et al., 1981, "Crosslinking Mechanism of an Anhydride-Cured Epoxy Resin as Studied by Fourier Transform Infrared Spectroscopy," Journal of Polymer Science 19(2):549-570.

(Continued)

*Primary Examiner* — Robert D. Harlan
(74) *Attorney, Agent, or Firm* — Jones Day

(57) ABSTRACT

Described herein are metal amidine complexes in combination with a second compound useful as catalysts in a number of polymerization reactions, including polyurethane and epoxy polymerization reactions. Also described herein are various coating compositions and methods of using same for coating substrates using the metal amidine complexes in combination with a second compound.

50 Claims, No Drawings

(56) References Cited

FOREIGN PATENT DOCUMENTS

| WO | WO 96/20967 A1 | 7/1996 |
|---|---|---|
| WO | WO 2006/022899 A2 | 3/2006 |
| WO | WO 2012/122098 A1 | 9/2012 |

OTHER PUBLICATIONS

Blank et al.. 1990, "Cross-linking with Polyurethanes," Polymeric Materials: Science and Engineering, Proceedings of the ACS Division of Polymeric Materials: Science and Engineering 63:931-935.

Chen et al., 1996, "Model complexes for the carboxylate-histidine-metal triad systems in metalloenzymes. Synthesis, crystal structures and spectroscopic properties of [M(Him)$_2$(O$_2$CMe)$_2$] (M=Zn$^{II}$ or Co$^{II}$, Him=imidazole)," J. Chem. Soc., Dalton Trans. 16(1):3465-3468.

Frisch et al., 1998, "Novel Delayed-Action Catalyst/Co-Catalyst System for C.A.S.E. Applications," 60 Years of Polyurethanes, Technomic Publishing Co., Inc.:287-303.

International Search Report for International Application No. PCT/US2012/027719, mailed Jul. 26, 2012.

International Search Report for International Application No. PCT/US2005/014064, mailed Jan. 16, 2008.

Matějka et al., 1986,"Specific Features of the Kinetics of Addition Esterification of Epoxide with the Carboxyl Group," Polymer Bulletin 15:215-221.

Nahlovsky et al., 1987, "Catalysis of Diol Propellant Binder Cure Reactions with Isocyanates," Technology of Energetic Materials, Manufacturing and Processing—Valuation of Product Properties, 18$^{th}$ International Annual Conference of ICT Jul. 1-3, 1987, Karlsruhe, Federal Republic of Germany, pp. 39-1-39-12.

Office Action mailed Jan. 10, 2011 for U.S. Appl. No. 12/233,239, filed Sep. 18, 2008.

Office Action mailed Jan. 25, 2008 for U.S. Appl. No. 11/115,016, filed Apr. 25, 2005.

Office Action mailed Jan. 25, 2008 for U.S. Appl. No. 11/458,015, filed Jul. 17, 2006.

Office Action mailed Jul. 18, 2008 for U.S. Appl. No. 11/458,015, filed Jul. 17, 2006.

Office Action mailed Jul. 7, 2010 for U.S. Appl. No. 12/233,239, filed Sep. 18, 2008.

Office Action mailed May 30, 2012 for U.S. Appl. No. 13/303,862, filed Nov. 23, 2011.

Pettinari et al., 1998,"Ligation properties of N-substituted imidazoles: synthesis, spectroscopic and structural investigation, and behavior in solution of zinc (II) and cadmium (II) complexes," Polyhedron 17(10):1677-1691.

Smiesko et al., 2003, "Coordination and thermodynamics of stable Zn(II) complexes in the gas phase," J. Biomol. Struct. Dyn. 20(6):759-770.

Squiller et al., 1987, "Catalysis in Aliphatic Isocyanate-Alcohol Reaction," Proceedings of the Fourteenth Water-borne and Higher-Solids Coatings Symposium, New Orleans, LA, U.S.A., Feb. 24-27, pp. 460-477.

\* cited by examiner

COMPOSITIONS OF A METAL AMIDINE COMPLEX AND SECOND COMPOUND, COATING COMPOSITIONS COMPRISING SAME

This application claims the benefit of U.S. Provisional Patent Application No. 61/449,709, filed Mar. 6, 2011, incorporated herein by reference in its entirety.

1. FIELD OF THE INVENTION

Described herein are metal amidine complexes in combination with a second compound that are useful as catalysts for a number of polymerization reactions, including polyurethane and epoxy polymerization reactions.

2. BACKGROUND

2.1 Polymerization by Reaction of Epoxy Functional Resins with Carboxy and Anhydride Functional Compounds, Dicyandiamide and Phenols Epoxy compounds react with carboxylic acids or with anhydrides. This reaction can be catalyzed. Antoon and Koenig (J. Polym. Sci., Polym. Chem. Ed. (1981) 19(2):549-70) studied the mechanism of catalysis by tertiary amines of the reaction of anhydrides with epoxy resins, typically a glycidyl ether of bisphenol A. They pointed out that it is the quaternary ammonium salt zwitterion that initiated the polymerization reaction. Matejka and Dusek studied the reaction of phenylglycidyl ether model compounds with caproic acid in the presence of a tertiary amine as the catalyst (Polym. Bull. (1986) 15(3):215-21). Based on their experimental data, they suggested that this is an addition esterification process.

Metal salts and amines have been used as catalysts for the epoxy-carboxyl/anhydride reaction. Whittemore et. al. (U.S. Pat. No. 3,639,345) disclosed thermosetting resins using an epoxy functional bisphenol A and a trimellitic anhydride ester with an amine, an imidazole or an aminoalkyl phenol, as the catalyst.

Metal salts or Lewis acid catalysts are also used for the epoxy-carboxyl/anhydride reaction. For example, the catalytic effect of metal salts for the epoxy-carboxyl.anhydride reaction was recognized by Connelly et. al. (ZA 6,907,152) who described the use of zinc acetate, chromium acetate, iron octoate, zinc naphthenate, cobalt naphthenate and manganese naphthenate as catalysts A major problem with these known catalysts is the poor stability of the combination of the epoxy and carboxyl/anhydride reactants at ambient room temperature in the presence of catalyst. The increase in viscosity requires the epoxy and the carboxyl/anhydride compounds to be formulated into two separate packages. A further problem is the yellowing tendency of amines during the bake or heating cycle.

Additionally, single package epoxy resin systems conventionally include a latent curing agent, typically dicyandiamide. This curing agent requires a long cure period, even at high temperatures. For example, normally dicyandiamide-epoxy system (e.g., Epon 828, Shell Chemical Company), without the presence of an accelerator, requiring curing at temperatures above 180° C. for at least 30 minutes to obtain a cured thermoset for practical applications (adhesives, coatings, and sealants). To increase the curing speed and to reduce the curing temperature, curing accelerators such as imidazoles and ureas have been incorporated into epoxy-dicyandiamide systems. The prepared one-package thermosetting materials, however, suffer from drawbacks, including problems with storage stability due, for example, to the basic nature of free imidazoles.

Thus, it is desirable to have a catalyst or catalyst composition, for use in a single-package epoxy resin system, that does not suffer from one or more of these drawbacks. Furthermore, it is desirable to have such a catalyst or catalyst composition that is capable of curing at an extremely rapid speed and at a reduced cure temperature without affecting the storage stability of the single-package epoxy resin system.

2.2 Polyurethane Reactions

The reaction of isocyanates and hydroxyl compounds to form urethanes is the basis for the production of polyurethanes. Metal compounds (e.g., tin, zinc and bismuth compounds) and tertiary amines have been known to catalyze the reaction of isocyanate and hydroxyl groups to form urethane. See Proceedings of Water Borne and High Solids Coatings Symposium, Feb. 25-27, 1987, New Orleans, at Page 460. Commercially available catalysts used in this reaction are organotin compounds (e.g., dibutyltin dilaurate and dibutyltin diacetate), zinc carboxylates, bismuth carboxylates, organomercury compounds and tertiary amines.

There are several problems with these commercially available catalysts. When used in the process for polyurethane coatings, the cure of the coatings under high humidity or at low temperature conditions is not satisfactory. They catalyze the undesirable side reaction of isocyanate with water to form amines and carbon dioxide. The carbon dioxide may cause blisters in the coating and the amines react with isocyanates resulting in low gloss coatings. Moreover, the cure rate at low temperatures is too slow. The commercially available catalysts also catalyze the degradation of the resulting polymer product. Furthermore, several of the commercially available urethane catalysts, particularly those containing heavy metals and tertiary amines, are highly toxic and are environmentally objectionable.

Blocked isocyanates are used in many coating applications, such as powder coatings, electrocoatings, coil coatings, wire coatings, automotive clear top coatings, stone chip resistant primers, and textile finishes. Traditionally, these coating processes employ organic solvents, which may be toxic and/or obnoxious and cause air pollution. In recent years, the legal requirements for low or no pollution of the environment have led to an increase in the interest in waterborne and high solids coatings. Furthermore, in processes wherein blocked isocyanates are used, heating to an elevated temperature is necessary to remove the blocking group from the blocked isocyanate to form free isocyanates. A drawback to the use of this process is the high temperature required to remove the blocking group. The process is extremely slow without a catalyst. It is known that metal compounds such dialkyltin and certain bismuth and zinc salts are useful catalysts in these solvent borne coating processes. "Crosslinking with Polyurethanes." W. J. Blank, ACS Proceedings of Polymeric Materials Science and Engineering (1990) 63:931-935.

Conventional bismuth carboxylates, for example, suffer from drawbacks including that they do not provide improved resin performance nor are they effective in water-borne formulations.

For waterborne processes, the catalysts known to be useful are organo-tin and lead compounds. The toxicity of both lead and tin compounds presents serious environmental hazards. Furthermore, the use of solvents in solvent borne processes further result in the undesirable release of toxic and obnoxious chemicals into the environment.

Organotin compounds, such as dibutyltin oxide (DBTO), dioctyltin oxide (DOTO), dibutyltin dilaurate (DBTDL), dioctyltin dilaurate (DOTDL), dibutyltin diacetate (DBTDA) and the like (reference is made to U.S. Pat. Nos. 4,071,428, 4,615,779 and 4,785,068) are widely used, but suffer from drawbacks, including poor compatibility with epoxy resins used in electrocoating, production of films with surface defects such as cissing, and poor hydrolytic stability of these esters leads. They also suffer from lack of selectivity towards the polyol isocynate reaction leading to urethane, and can catalyze the degradation of the resulting polymer product.

2.2.1 Electrocoating Applications

Electrodepositable coatings are widely used, for example, for corrosion protection for metal substrates, such as those used in the automobile industry.

The electrodeposition process involves immersing an electroconductive substrate into a bath of an aqueous electrocoating composition, the substrate serving as a charged electrode in an electrical circuit comprising the electrode and an oppositely charged counter-electrode. Sufficient electrical current is applied between the electrodes to deposit a substantially continuous, adherent film of the electrocoating composition onto the surface of the electroconductive substrate.

Many cationic electrodeposition compositions used today are based on active hydrogen-containing resins derived from a polyepoxide and a capped aromatic or aliphatic polyisocyanate curing agent. Capping agents typically require cure temperatures in excess of 360° F. (182° C.) unless catalysts are used. Metal catalysts, such as stannous salts or mono- or diorganotin compounds, can catalyze the curing or cross-linking reaction at temperatures in the range 330-365° F. Drawbacks of typical catalysts include their cost and adverse environmental impact.

In order to conserve energy, reduce deformation of plastic parts attached to the metal object, and reduce color formation, a lower temperature cure (compared to catalyst-free or conventional) would be desirable. For example, the number of effective catalysts available and their ability to reduce cure temperatures below 340° F. (171° C.) for aromatic isocyanates, and 380° F. (193° C.) for aliphatic isocyanates while maintaining performance properties such as corrosion resistance is severely limited.

Use of lead compounds also suffers drawbacks because of the environmental and toxicological hazards associated with lead compounds.

Tin catalysts suffer drawbacks, for example unsuitability in aqueous systems and adverse environmental impact. For example, dialkyltin oxides are subject to a number of regulatory restrictions in various countries due to environmental concerns.

Bismuth catalysts also suffer drawbacks. For example, bismuth catalysts are often less effective as catalysts in electocoating applications, compared to, for example, dialkyltin oxides. Furthermore, bismuth catalysts often suffer from high cost and/or low availability.

2.2.2 Powder Coating Applications

Powder coatings have many potential applications. For example, light and weather resistant coatings may be obtained using heat curable, polyurethane (PUR) powder coatings. The PUR powder coatings currently commercially available suffer drawbacks, including the emission of blocking agents during thermal crosslinking.

One approach to avoiding the emission of blocking agents is to use known PUR powder coating crosslinking agents containing uretdione groups as described, e.g., in DE-A 2,312,391, DE-A 2,420,475, EP-A 45,994, EP-A 45,996, EP-A 45,998, EP-A 639,598 and EP-A 669,353. Uretdione powder coating crosslinking agents suffer from drawbacks, including the relatively low reactivity of the internally blocked isocyanate groups, which generally require stoving temperatures of at least 160° C. Furthermore, curing at temperatures as low as 100° C. suffers from drawbacks, including that the reaction is impracticably slow.

Efforts to solve this problem through the use of various catalysts—such as tin(II) acetate, tin(II) octoate, tin(II) ethylcaproate, tin(II) laurate, dibutyltin diacetate, dibutyltin dilaurate, dibutyltin maleate (for example EP 803 524, EP-A 45,994, EP-A 45,998, EP-A 601,079, WO 91/07452 or DE-A 2,420,475), iron(III) chloride, zinc chloride, zinc 2-ethylcaproate and molybdenum glycolate or tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine (for example EP-A 639 598), N,N,N'-trisubstituted amidines (U.S. Pat. No. 5,847, 044), tetra alkyl ammonium compounds and combinations with reactive compounds that are able to react with acid groups, (E. Spyrou, H. Loesch, and J. V. Weiβ, "Highly Reactive, Blocking Agent-Free Polyurethane Powder Coatings", 8th Nuernberg Congress, Creative Advances in Coatings Technology; Nuernberg, Germany, April, 2005, U.S. Pat. No. 6,914,115 B2), metalloorganic carboxylate, alcoholate, or acetylacetonate, and combinations of these catalysts with reactive agents such as an epoxy, or an oxazoline compound (WO 00/34355, U.S. Pat. No. 7,019,088 B1)—suffer additional drawbacks, including, for example, low catalytic efficiency, sensitivity to the presence of water, and catalysis of degradation of polyurethane product, and cure temperature.

Thus, an objective of the disclosure is to develop catalysts with high catalytic efficiency for the isocyanate-hydroxyl reaction to form urethane and/or polyurethane. Another objective of the disclosure is to develop catalysts which provide improved cure at a lower temperature and is less sensitive to the presence of water. Yet another objective of the disclosure is to provide catalysts for the isocyanate-hydroxyl reaction which would not catalyze the undesired side reaction of water with isocyanates or the undesired degradation of the polyurethane. It is desirable to have a catalyst or catalyst composition that does not exhibit these side effects or suffer from one or more of these drawbacks.

3. SUMMARY

Described herein, in one aspect, are compositions comprising a metal amidine complex and one or more second compounds. Also described herein are the use of such compositions for the reaction of compounds with isocyanate and hydroxyl functional groups to form urethane and/or polyurethane, and processes employing such catalyst compositions. In certain embodiments, a composition comprising a metal amidine complex and one or more second compounds exhibits a synergistic effect, for example in the production of urethanes and polyurethanes which are important in many industrial applications, such as: coatings, foams, adhesives, sealants, and reaction injection molding (RIM) plastics. In certain embodiments, the compositions described herein are synergistically effective in catalyzing both a solvent borne and a waterborne process to form such coatings.

Described herein are also methods of catalyzing the process for de-blocking blocked isocyanates—e.g., ketoxime, pyrazole, alcohol, glycol or phenol blocked products—to form crosslinked coatings. More particularly, the present disclosure relates, in one aspect, to the use of a composition comprising a metal amidine compleox and one or more second compounds effective in catalyzing both a solvent borne and a waterborne process to form such crosslinked coatings. Thus, provided herein is a method comprising catalyzing catalyzing both a solvent borne and a waterborne process to form such crosslinked coatings using these compositions. These compositions also can be utilized as part of a method comprising catalyzing blocked isocyanates in cationic electrocoating applications. In another aspect, provided herein is a blocked isocyanate group-containing electrocoating composition comprising a composition comprising a metal amidine complex and one or more second compounds, having low-temperature curability and corrosion resistance. The compositions provided herein can exhibit such desirable properties as, for example, reduced cure temperatures, improved ultrafiltration, reduced grind preparation, increased deposition rate, improved dispersability or emulsifiability, reduced toxicity, easier handling, and improved color maintenance.

In one aspect, the present disclosure is directed to compositions comprising a metal amidine complex and one or more second compounds which effectively catalyze the reaction of epoxy-carboxyl/anhydride at lower temperatures, as compared to, for example, conventional catalysts. The use of these catalyst compositions in the coating process not only reduces yellowing, but also provides excellent room temperature stability and excellent humidity resistance. The improved stability with the use of the catalysts of this disclosure provides for the formulation of a single packaged product. Thus, in certain embodiments is provided a single packaged product comprising such a composition, as well as an epoxy compound and a carboxyl/anhydride compound, as described hereinbelow.

In one embodiment, the metal amidine complexes described herein comprise a metal, an amidine, and a carboxylate. In certain embodiments, the metal amidine carboxylate complexes are metal(II) amidine carboxylate complexes. In a particular embodiment, the metal amidine complex is of the chemical formula M(amidine)$_w$(carboxylate)$_2$, where w is an integer from 1 to 4, for example 2 or 4. In certain embodiments, the metal is zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium. In a particular embodiment, the metal is zinc. In a particular embodiment, the metal is in the +2 oxidation state.

In certain embodiments, the amidine of the metal amidine complex is an amidine of formulae I-VIII

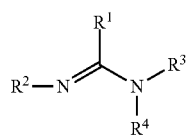

(I)

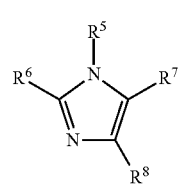

(II)

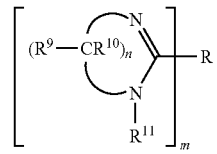

(III)

wherein $R^1$ is hydrogen, an organic group attached through a carbon atom (such as $C_1$-$C_{36}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ alkyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl), an amine group which is optionally substituted, or a hydroxyl group which is optionally etherified with a hydrocarbyl group having up to 8 carbon atoms;

$R^2$ and $R^3$ are each independently hydrogen or an organic group attached through a carbon atom (such as $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ alkyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl), or are joined to one another by an N=C—N linkage to form a heterocyclic ring with one or more hetero atoms or a fused bicyclic ring with one or more heteroatoms;

$R^4$ is hydrogen, an organic group attached through a carbon atom (such as $C_1$-$C_{36}$ alkyl, $C_1$-$C_{36}$ alkyl interrupted by oxygen or sulfur; $C_2$-$C_{24}$ alkenyl, $C_4$-$C_{15}$ cycloalkyl which is unsubstituted or substituted by $C_1$-$C_4$ alkyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl) or a hydroxyl group which can be optionally etherified with a hydrocarbyl group having up to 8 carbon atoms;

$R^5$, $R^6$, $R^7$, and $R^8$ are independently hydrogen, alkyl, substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups optionally alkyl substituted with alkyl, substituted alkyl, hydroxyalkyl, aryl, aralkyl, cycloalkyl, heterocycles, ether, thioether, halogen, —N(R)$_2$, polyethylene polyamines, nitro groups, keto groups or ester groups;

$R^9$, $R^{10}$ and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms (wherein the aryl group of the aralkyl is further substituted by alkyl of 1 to 36 carbon atoms, ether, thioether, halogen, —N(R)$_2$, polyethylene polyamines, nitro groups, keto groups, ester groups, or carbonamide groups) (wherein the alkyl group of the aralkyl is optionally substituted with alkyl, substituted alkyl, hydroxyalkyl, aryl, aralkyl, cycloalkyl, heterocyclics, ether, thioether, halogen, —N(R)$_2$, polyethylene polyamines, nitro groups, keto groups or ester groups), wherein the R of —N(R)$_2$ is alkyl, alkylene, aryl, aralkyl, cycloalkyl or heterocyclic radical, optionally substituted with halogen, nitro, alkyl, alkoxy or amino, and, when m=1, R is hydrogen or a plurality of radicals optionally joined by hetero atoms O, N or S;
m=1 or 2; n=2 or 3;

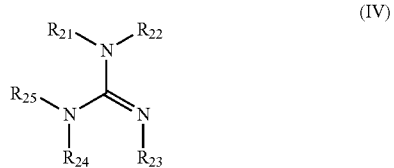

(IV)

wherein each of $R_{21}$, $R_{22}$, $R_{23}$, $R_{24}$, and $R_{25}$ is hydrogen, (cyclo)alkyl, aryl, aromatic, organometallic, a polymeric structure, or together can form a cycloalkyl, aryl, or an aromatic structure, and wherein $R_{21}$, $R_{22}$, $R_{23}$, $R_{24}$, and $R_{25}$ can be the same or different. As used herein, "(cyclo)alkyl" refers to both alkyl and cycloalkyl. When any of the R groups "together can form a (cyclo)alkyl, aryl, and/or aromatic group" it is meant that any two adjacent R groups are connected to form a cyclic moiety, such as the rings in structures (V)-(VIII) below.

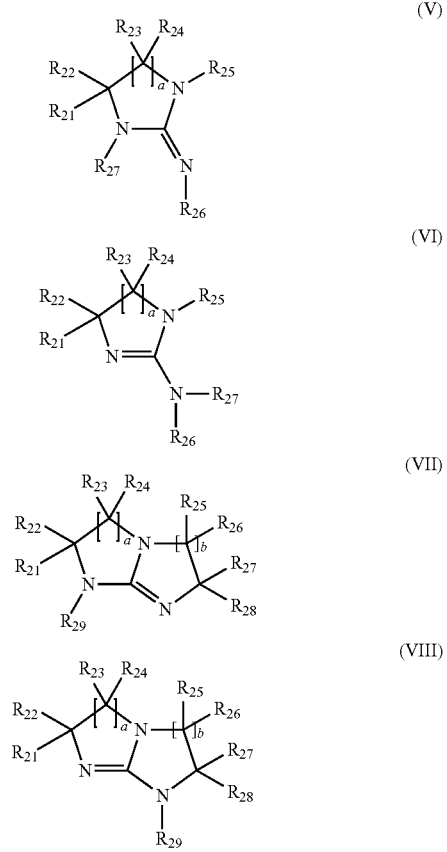

It will be appreciated that in some embodiments, the double bond between the carbon atom and the nitrogen atom that is depicted in structure (IV) may be located between the carbon atom and another nitrogen atom of structure (IV). Accordingly, the various substituents of structure (IV) may be attached to different nitrogens depending on where the double bond is located within the structure.

In certain embodiments, the cyclic guanidine comprises the guanidine of structure (IV) wherein two or more R groups of structure (IV) together form one or more rings. In other words, in some embodiments the cyclic guanidine comprises ≥1 ring. For example, the cyclic guanidine can either be a monocyclic guanidine (1 ring) as depicted in structures (V) and/or (VI) below, or the cyclic guanidine can be polycyclic (≥2 rings) as depicted in structures (VII) and (VIII) above.

Each substituent of structures (V) and/or (VI), $R_{21}$-$R_{27}$, can comprise hydrogen, (cyclo)alkyl, aryl, aromatic, ogranometallic, a polymeric structure, or together can form a cycloalkyl, aryl, or an aromatic structure, and wherein $R_{21}$-$R_{27}$ can be the same or different. Similarly, each substituent of structures (VII) and (VIII), $R_{21}$-$R_{29}$, can be hydrogen, alkyl, aryl, aromatic, organometallic, a polymeric structure, or together can form a cycloalkyl, aryl, or an aromatic structure, and wherein $R_{21}$-$R_{29}$ can be the same or different. Moreover, in some embodiments of structures (V) and/or (VI), certain combinations of $R_{21}$-$R_{27}$ may be part of the same ring structure. For example, $R_{21}$ and $R_{27}$ of structure (V) may form part of a single ring structure. Moreover, in some embodiments, it will be understood that any combination of substituents ($R_{21}$-$R_{27}$ of structures (V) and/or (VI) as well as $R_{21}$-$R_{29}$ of structures (VII) and/or (VIII) can be chosen so long as the substituents do not substantially interfere with the catalytic activity of the cyclic guandine.

In certain embodiments, each ring in the cyclic guanidine is comprised of ≥5-members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("a" and/or "b"=1 in structures (V)-(VIII)), a 6-member ring will have 6 atoms in the ring structure ("a" and/or "b"=2 in structures (V)-(VIII)), and a 7-member ring will have 7 atoms in the ring structure ("a" and/or "b"=3 in structures (V)-(VIII)) It will be appreciated that if the cyclic guanidine is comprised of ≥2 rings (e.g., structures (VII) and (VIII), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine can be different from the number of members in any other ring of the cyclic guanidine.

It will also be understood that in certain embodiments of the cyclic guanidine the nitrogen atoms of structures (V)-(VIII) can further have additional atoms attached thereto. Moreover, in some embodiments, the cyclic guanidine can either be substituted or unsubstituted. For example, as used herein in conjunction with the cyclic guanidine, "substituted", in certain embodiments, refers to a cyclic guanidine wherein $R_{25}$, $R_{26}$, and/or $R_{27}$ of structures (V) and/or (VI) and/or $R_{29}$ of structures (VII) and/or (VIII) is not hydrogen. As used herein in conjunction with the cyclic guanidine, "unsubstituted", in certain embodiments, refers to a cyclic guanidine wherein $R_{21}$-$R_{27}$ of structures (V) and/or (VI) and/or $R_{21}$-$R_{29}$ of structures (VII) and/or (VIII) is hydrogen. In some embodiments, the substituted cyclic guanidine is 1,5,7-triazabicyclo[4.4.0]dec-5-ene.

In certain embodiments, the amidine of the metal amidine complex is not an amidine of Formulae (I)-(III).

In certain embodiments, the carboxylate of the metal amidine complex is the carboxylate of a carboxylic acid of the following formula:

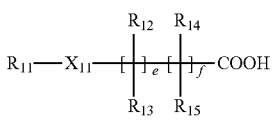

wherein $R_{11}$ is hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ alkyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl; —$COR_{16}$, a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulae:

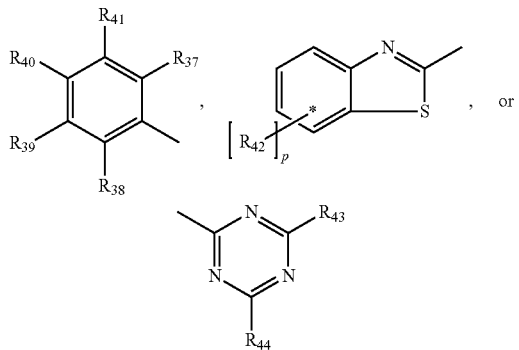

wherein $R_{12}$, $R_{13}$, $R_{14}$ and $R_{15}$ independently are hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —$COR_6$, with the proviso that, if one of the radicals $R_{12}$, $R_{13}$, $R_{14}$ and $R_{15}$ is hydroxyl, the other radical attached to the same carbon atom is other than hydroxyl; or else $R_{12}$ and $R_{13}$ or $R_{14}$ and $R_{15}$, together with the carbon atom to which they are attached, form an unsubstituted or $C_1$-$C_4$ alkyl-substituted $C_5$-$C_{12}$ cycloalkylidene ring;

wherein $R_{16}$ is hydroxyl, $C_1$-$C_{18}$ alkoxy, $C_2$-$C_{18}$ alkoxy which is interrupted by oxygen or sulfur; or

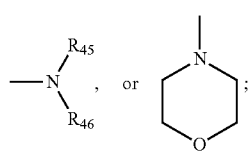

wherein $R_{37}$, $R_{38}$, $R_{39}$, $R_{40}$ and $R_{41}$ are independently hydrogen, hydroxyl, halogen, nitro, cyano, $CF_3$, —$COR_6$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or else the radicals $R_{38}$ and $R_{39}$ or the radicals $R_{39}$ and $R_{40}$ or the radicals $R_{40}$ and $R_{41}$ or the radicals $R_{37}$ and $R_{41}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R_{37}$, $R_{38}$, $R_{39}$, $R_{40}$ and $R_{41}$ is hydrogen;

$R_{42}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxgyen or sulfur; $C_1$-$C_{18}$ alkylthio or $C_2$-$C_{24}$ alkenyl;

$R_{43}$ and $R_{44}$ are independently hydrogen, $C_1$-$C_{25}$ alkyl, $C_1$-$C_{18}$ alkoxy or —Y—$(CH_2)_s$ $COR_6$;

$R_{45}$ and $R_{46}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl;

$X_{11}$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if m and n are 0, $X_{11}$ is other than oxygen and sulfur;

Y is oxygen or

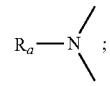

$R_a$ is hydrogen or $C_1$-$C_8$ alkyl;
e and f independently of one another are integers from 0 to 10, p is an integer from 0 to 4, and s is an integer from 1 to 8.

In certain embodiments, the carboxylate of the metal amidine complex is formate, acetate, 2-ethylhexanoate, or neodecanoate.

In certain embodiments, the metal amidine complex is one as described in U.S. Pat. No. 7,485,729 to Hsieh et al, herein incorporated by reference in its entirety. Procedures for preparing the metal amidine complexes described herein can be found at cols. 21-22 and Table 2 of U.S. Pat. No. 7,485,729, specifically incorporated herein by reference.

In certain embodiments, the second compound of the composition comprising a metal amidine complex and one or more second compounds is a metal compound, a tertiary amine, or an acid.

In certain embodiments, the metal of the metal compound is tin (e.g., stannous), mercury, bismuth, barium, zinc, calcium, cadmium, zirconium, aluminum, nickel, manganese, vanadium, iron, cerium, thorium, cobalt, copper, titanium, hafnium, lithium, lead, or potassium. In particular embodiments, the metal of the metal compound is zinc or bismuth. In certain embodiments, the metal is a metal carboxylate. In certain embodiments, the carboxylate of the metal carboxylate is a carboxylte as described in paragraph [0037], above. In a specific embodiment, the second compound is zinc acetylacetonate (acac).

In certain embodiments, the tertiary amine is an imidazole, a morpholine, an ethylenediamine, or a trialkylamine. In a particular embodiment, the tertiary amine is an imidazole.

In certain embodiments, the acid is a carboxylic acid, a sulfonic acid, a phosphoric acid, or a phosphate. In certain embodiments, the acid is an aliphatic carboxylic acid, such as isononanoic acid.

In various specific embodiments, the second compound is one of the compounds set forth in the following tables:

| Metal | Compound |
|---|---|
| Tin | Dibutyltin dilaurate Dibutyltindiacetate |
| | Dibutyltin dimercaptide |
| | Dibutyltin biisooctylmaleate |
| | Dialkyltin dialkylmercapto acid |
| | Dibutyltin di-2-ethylhexanoate |
| | Dibutyltin dimaleate |
| | Dibutyltin diisooctylmercapto acetate |
| | Dimethyltin dimaleate |
| | Dimethyltin dimercaptide |
| | Dimethyltin diisooctylmercapto-acetate |
| | Dioctyltin dilaurate |
| | Dimethyltin dilaurate |
| | Dioctyltin diisooctylmercapto-acetate |
| | Dioctyltin dimercaptide |
| | Dioctyltin dilaurate |
| | Dibutyltin oxide |
| | Monobutyltindihydroxychloride |
| | Dioctyltin dineodecanoate |
| | Organotin halides |
| | Dibutyltin S,S-Dibutyldithiocarbonate |
| | Dibutyltin Bis-O-Phenylphenate |
| | Dibutyltin Maleate |
| | Dimethyltin Dichloride |
| Stannous | Octoate |
| | Oxalate |
| | Stearate |
| | Naphthenate |
| Mercury | Phenylmercuric acetate |
| | Phenylmercuric propionate |
| Bismuth | Octoate |
| | Neodacanoate |
| | Naphthenate |
| | Stearate |
| | Triphenylbismuth |
| Barium | Nitrate |
| Zinc | Octoate |
| | Neodecanoate |
| | acetylacetonate |
| | Oxalate, naphthenate, alkyl sulfonate, aryl sulfonate, organophosphates |
| Calcium | Naphthenate, octoate, neodecanoate, alkylsulfonate, aryl sulfonate |
| Cadmium | Octoate |
| Zirconium | acetylacetonate |
| | 6-methylheptanedione |
| Aluminum | Dionate |
| Nickel | Acetylacetonate |
| Manganese | Naphthenate |
| Vanadium | Acetylacetonate |
| Iron | Fe III acetylacetonate |
| Cerium | Naphthenate, octoate, neodecanoate, alkylsulfonate, aryl sulfonate |
| Thorium | acac |
| Cobalt | Octoate |
| | Dionate |
| Copper | Acac |
| Titanium | Tetrabutoxide, octoate, Neodecanoate, Oleate, Alkoxides, alkylsulfonate, aryl sulfonate |
| Hafnium | diketonate |

-continued

| Metal | Compound |
|---|---|
| Lithium | Neodecanoate |
| | Acetate |
| Lead | Stannate |
| | Acetylacetonate |
| | Dioxide |
| Potassium | Octoate |
| | Acetate |

| Tertiary amines |
|---|
| Bis-(2-dimethylaminoethyl) ether |
| Bis-(2-diethylaminoethyl) ether |
| N,N-Dimethylcyclohexylamine |
| N,N,N',N''-Pentamethyldiethylenetriamine |
| Triethylenediamine |
| N-Ethylmorpholine |
| N-Cocomorpholine |
| N,N-Dimethylpiperazine |
| N-Methylimidazole |
| N-(3-Aminopropyl)imidazole |
| 1,2-Dimethylimidazole |
| Bis(dimethylaminoethyl)ether |
| N,N,N',N'-Tetramethylhexanediamine |
| N,N',N'-Trimethylaminoethylpiperazine |
| N,N,N',N'-Tetramethylethylenediamine |
| N-Methyl-N'-hydroxyethylpiperazine |
| N,N',N'-Trimethylaminoethylethanolamine |
| 2,2'-Dimorpholinodiethylether |
| N,N-Dimethylhexadecylamine |
| 4-[2-(Dimethylamino)ethyl]morpholine |
| N-ethyl morpholine |
| N-methyl morpholine |
| N-butyl morpholine |
| N-methoxyethyl morpholine |
| N,N,N',N',N''-Pentamethyldipropylenetriamine |
| Dimethylaminoethoxyethanol |
| Dimethylethanolamine |
| 1,3,5-Tris[3-(Dimethylamino)propyl]hexahydro-s-triazine |
| 2-Hydroxypropyltrimethylammonium formate |
| 2,4,6-Tris(dimethylaminomethyl) phenol |
| 1,4-diazabicyclo[2.2.2]octane (DABCO) |
| 1,8-Diazabicyclo[5,4,0]undec-7-ene |
| 2-Methyl-1,4-diaza[2.2.2]-bicyclo-octane |
| N,N'-dimethylaminoethyl N,methyl ethanolamine |
| Triethylamine |
| N-hydroxy-alkyl quaternary ammonium carboxylate |
| Dimethylcyclohexylamine |
| Dimethyldodecylamine |
| N,N,N',N'-Tetramethyl-1-3-butane diamine |
| Pentamethyl-diethylene triamine |
| N,N,N',N'-Tetramethyl-n-hexyl diamine |
| N,N-dimethyl cyclohexylamine |
| Tris(dimethylaminopropyl)amine |
| N-methyl dicyclohexylamine |
| Bis(N,N-dimethyl-3-amino-propyl)amine |
| Quinuclidine (1,4-ethylenepiperdine) |
| 2-methylaminoethyl-1,3-dimethylaminopropyl ether |
| N,N-dimethyl-N',N'-2-hydroxy(propyl)-1,3-propylene diamine |
| N,N,N'-trimethyl-N'hydroxyethyl-bis(amino ethyl)ether |
| N,N-bis(3-dimethylamino-propyl)amino-2-propanol |
| (N,N-dimethylaminoethoxy) ethanol |
| N,N'-dimorpholinodiethyl ether |

| Acids |
|---|
| Dodecylbenzene Sulfonic Acid |
| Dinonyl naphthalene sulfonic acid |
| Dinonyl naphthalene disulfonic acid |
| Phenyl Acid Phosphate |
| IsoOctyl Acid Phosphate |
| Isononanoic Acid |

In various specific embodiments, the metal amidine comples and second compound can be: Zn(1-methylimidazole)$_2$(acetate)$_2$ and DABCO; Zn(1-methylimidazole)$_2$(acetate)$_2$ and zinc acetylacetonate; Zn(1-methylimidazole)$_2$(acetate)$_2$ and dibutyltin dilaurate; Zn(1-methylimidazole)$_2$ (acetate)$_2$ and zirconium acetylacetonate; Zn(1-Methylimidazole)$_2$(2-Ethylhexanoate)$_2$ and a bismuth carboxylate; Zn(1,1,3,3-Tetramethylguanidine)$_2$(2-Ethylhexanoate)$_2$ and a bismuth carboxylate; Zn(1-methylimidazole)$_2$(acetate)$_2$ and a bismuth carboxylate; Zn(1-methylimidazole)$_2$(acetate)$_2$ and lithium neodecanoate; Zn(2-Ethylhexanoate)$_2$(acetate)$_2$ and phenylmercuric acetate; Zn(1-methylimidazole)$_2$(acetate)$_2$ and dinonylnaphthalene disulfonate; Zn(1-methylimidazole)$_2$(acetate)$_2$ and 1,2-dimethylimidazole; or Zn(1-methylimidazole)$_2$(acetate)$_2$ and 2-methylimidazole.

In a particular embodiment is provided a powder coating composition comprising a catalyst composition comprising a metal amidine comples and zinc acetylacetonate.

In certain embodiments, the composition comprises a metal amidine complex and a second compound, wherein the second compound is present in an amount from between about 10% and about 80% of the composition by weight, or from about 20% to about 70%, or from about 30% to about 60%, or from about 40% to about 50%.

In certain embodiments, the second agent is not a zinc carboxylate or a bismuth carboxylate Provided herein are also powder coatings, and liquid coatings such as coil coating, can coating, wire coating, plastic coatings, each comprising as a catalyst the metal amidine complex described herein. In one embodiment is provided a polyurethane powder coating composition containing A) a binder component which is solid below 40° C. and liquid above 130° C. and has an OH number of about 25 to about 200 and a number average molecular weight of about 400 to about 10,000; B) a polyaddition compound which is solid below 40° C. and liquid above 125° C. and contains uretdione groups and optionally free isocyanate groups and is prepared from aliphatic and/or cycloaliphatic diisocyanates and/or aromatic isocyanates; and C) one or more cataylst compositions comprising a metal amidine complex and one or more second compounds, as described herein. In certain embodiments, components A) and B) are present in amounts such that component B) has about 0.6 to about 1.4 isocyanate groups for each hydroxyl group present in component A) and the amount of component C) is about 0.05 to about 10 wt. %, based on the total weight of the coating composition. In certain embodiments, the polyurethane powder coating further comprises D) an acid scavenger, for example to react with the free carboxyl groups in the binder. In certain embodiments, the polyurethane powder coating is useful for preparing and/or used in coating heat resistant substrates. Thus, in certain embodiments is provided a method comprising coating a substrate with a polyurethane powder coating composition described above, and curing said coated substrate.

In certain embodiment is provided a coating composition comprising a carboxyl- and/or anhydride-functional compound, a dicyandiamide, and/or phenols, further comprising one or more cataylst compositions comprising a metal amidine complex and one or more second compounds, as described herein. The use of such a catalyst composition in the epoxy-carboxyl anhydride reaction improves the stability of the reactants at room temperature and avoids yellowing or blistering in the coating produced. Furthermore, the improved stability of the reactants in the presence of the catalyst enables a single packaged product for the epoxy-carboxy/ahydride mixture.

Provided herein are also polyurethane powder coating compositions comprising one or more cataylst compositions comprising a metal amidine complex and one or more second compounds, as described herein. In certain embodiments, the polyurethane powder coating compositions do not release reaction products, have increased reactivity and yield completely crosslinked coatings at distinctly lower stoving temperatures or at correspondingly shorter stoving times than previously known prior art powder coating compositions containing uretdione curing agents, without yellowing of the formulation. Without being limited by mechanism, it is believed that the metal amidine complex catalysts described herein so strongly accelerate the dissociation of uretdione groups that polyurethane powder coating compositions may be formulated with them using known uretdione curing agents such that the powder coating compositions crosslink to yield high quality coatings at relatively low stoving temperatures and within a short time, with no yellowing.

In certain embodiments, provided herein are uretdione-containing coating compositions comprising a) a binder having hydroxyl groups, b) a polyaddition compound having uretdione groups and optionally free isocyanate groups as a hardener, c) one or more cataylst compositions comprising a metal amidine complex and one or more second compounds, as described herein, and optionally d) auxiliary agents and additives. In certain embodiments, the binder is free of carboxyl groups or the concentration of carboxyl groups is less than the concentration of catalyst composition (c) or, in the case of a higher concentration of carboxyl groups compared to the concentration of the catalyst (c) used, an amount of an acid scavenger (such as, for example, epoxies, carbodiimides, trialkylorthoformates, amine compounds, or oxazolines) is added that is necessary for blocking the amount of carboxyl groups for achieving the required concentration of the catalyst (c). In certain embodiments, such uretdione-containing coating compositions are curable at lower temperatures as compared to those without any catalyst (c), or with conventional catalysts alone such as free amidines.

In certain embodiments, provided herein is a coating composition comprising an organic binder (for example, a film-forming binder, such as a coating material), and, as corrosion inhibitors, one or more catalyst composition comprising a metal amidine complex and one or more second compounds, as described herein. In such embodiments, the catalyst compositions are used in coating compositions for protecting metallic surfaces. Also provided are methods of inhibiting the corrosion of a substrate, comprising application a coating composition as described in this paragraph, and curing the coated substrate.

In certain embodiments provided herein is a coating composition comprising a silane terminated polymer, and a metal amidine complex described herein, or a catalyst composition comprising a metal amidine complex and one or more second compounds, as described herein.

4. DETAILED DESCRIPTION

4.1 Metal Amidine Complexes

In accordance with the present disclosure is provided a composition comprising a metal amidine complex and one or more second compounds (as described herein) for use in, for example, polyurethane and epoxy coatings. The catalyst compositions are suitable for powder, solventborne, solventless and waterborne coatings.

In certain embodiments, the amidine of the metal amidine complex has the formula

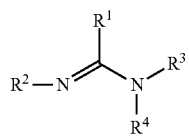

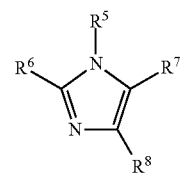

wherein $R^1$ is hydrogen, alkyl of 1 to 25 carbon atoms, an amine group which can be substituted, for example by an optionally substituted hydrocarbyl group, or a hydroxyl group which can be etherified, for example with an optionally substituted hydrocarbyl group having up to 8 carbon atoms; $R^2$ and $R^3$ each independently represent hydrogen or an organic group attached through a carbon atom or are joined to one another to form (with the linking —N═C—N—) a heterocyclic ring, with one or more hetero atoms or a fused bicyclic ring with one or more heteroatoms, and $R^4$ represents hydrogen, an organic group attached through a carbon atom or a hydroxy group which can be etherified, for example with an optionally substituted hydrocarbyl group having up to 8 carbon atoms. When $R^1$ or $R^4$ is an organic group it can for example contain 1 to 40 carbon atoms or can be a polymeric group, for example having a molecular weight of 500 to 50,000. The groups $R^1$, $R^2$, $R^3$, $R^4$ could contain as substituents a total of at least two or more alcoholic hydroxyl groups.

In certain embodiments, the amidine of the metal amidine complex is not an amidine of the aforementioned formula.

In certain embodiments, the amidine of the metal amidine complex is N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine,N-(hexyliminomethyl) morpholine,N-(α-(decylimino ethyl)ethyl)pyrrolidine,N'-decyl-N,N-dimethylformamidine, N'-dodecyl-N,N-dimethylformamidine, N'-cyclohexyl-N,N-acetamidine, pentamethylguanidine, tetramethylguanidine, or heptamethylisobiguanide In certain embodiments, the amidine of the metal amidine complex is an amidine in which one of the pairs $R^2$-$R^3$ or $R^2$-$R^4$ forms a 5 to 7 membered ring consisting of the two amidine nitrogen atoms and one of the pairs $R^1$-$R^3$ or $R^1$-$R^4$ forms a 5 to 9 membered ring consisting of one amidine nitrogen atom and carbon atoms. In specific embodiments, the amidine is 1,5-diazabicyclo(4.3.0) none-5-ene, 1,8-diazabicyclo(5.4.0) undec-7-ene, 1,4-diazabicyclo(3.3.0) oct-4-ene, 2-methyl-1,5-diazabicyclo(4.3.0) none-5-ene, 2,7,8-trimethyl-1,5-diazabicyclo(4.3.0) none-5-ene, 2-butyl-1,5-diazabicyclo(4.3.0) none-5-ene or 1,9-diazabicyclo(6.5.0) tridec-8-ene.

Particular catalytic amidine groups are those in which the groups $R^2$ and $R^3$ are joined to form (with the linking —N═C—N—) a heterocyclic ring, for example an imidazoline, imidazole, tetrahydropyrimidine, dihydropyrimidine or pyrimidine ring. Acyclic amidines and guanidines can alternatively be used.

In other embodiments, the amidine of the metal amidine complex is an amidine of the following formula:

where $R^5$, $R^6$, $R^7$, and $R^8$ are independently represent hydrogen, alkyl, or substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups, alkyl substituted with the various functional groups described above. In other embodiments, the amidine of the metal amidine complex is not an amidine of the aforementioned formula.

In certain embodiments, the amidine of the metal amidine complex is N-(2-Hydroxyethyl)imidazole, N-(3-Aminopropyl)imidazole, 4-(hydroxymethyl) Imidazole, 1-(tert-butoxycarbonyl)imidazole, Imidazole-4-propionic acid, 4-carboxylmidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 1-trimethylsilyl imidazole, 4-(hydroxymethyl) Imidazole hydrochloride, copolymer of 1-chloro-2,3-epoxypropane and imidazole, 1(p-toluenesulfonyl)imidazole, 1,1'-carbonylbisimidazole, 1-(2-cyanoethyl)-2-ethyl-4-methylimidazole, 2-phenyl-2-imidazoline pyromellitate, 4-(hydroxymethyl) Imidazole picrate, reaction product of 2-propenoic acid with 4,5-dihydro-2-nonyl-1H-imidazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl) imidazole formate, sodium imidazolate, or silver imidazolate.

In certain embodiments, the amidine of the metal amidine complesx is a cyclic amidine imidazoline or tetrahydropyrimidine of the formula:

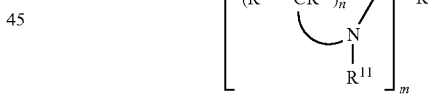

in which n=2 or 3, m=1 or 2, $R^9$, $R^{16}$ and $R^{11}$ are identical or different, and represent hydrogen, alkyl, or substituted alkyl, hydroxyalkyl, aryl, aralkyl, cycloalkyl, heterocyclics, ether, thioether, halogen, —N(R)$_2$,polyethylene polyamines, nitro groups, keto groups, ester groups, or carbonamide groups, alkyl substituted with the various functional groups described above, and R represents alkyl, alkylene, an aryl, aralkyl, cycloalkyl or heterocyclic radical, substituted if desired with halogen, nitro groups, alkyl groups, alkoxy groups or amino groups, and, when m=1, represents also hydrogen, a plurality of radicals being able to be joined, also by hetero atoms such as O, N or S, if desired. Salts of the above structures include carboxylic (aliphatic, aromatic and poly carboxylic), carbonic, sulfonic and phosphoric acid salts. In certain embodiments, the amidine of the metal amidine complex is not an amidine of the aforementioned formula.

In other embodiments, $R^9$, $R^{10}$, $R^{11}$ are independently hydrogen, alkyl, alkenyl or alkoxy of 1 to 36 carbons, cycloalkyl of 6 to 32 carbons or alkylamino of 1 to 36 carbon atoms, cycloalkyl of 5 to 12 carbon atoms, phenyl, hydroxyalkyl or hydroxycycloalkyl of 1 to 20 carbon atoms, methoxyalkyl of 1 to 20 carbon atoms, aralkyl of 7 to 9 carbon atoms, said aralkyl wherein the aryl group is further substituted by alkyl of 1 to 36 carbon atoms.

When m=2, R is alkylene of 1 to 12 carbons or arylene of 6 to 10 carbons, or a plurality of radicals being able to be joined, containing hetero atoms also by hetero atoms such as O, N or S, if desired.

In some embodiments imidazoline structures are where R is a long chain alkyl up to 18 carbon atoms, m=1 and $R^{11}$ is one of 2-hydroxyethyl, or 2-aminoethyl or 2-amido ethyl substituents.

In certain embodiments, the amidine of the metal amidine complex is 1H-Imidazole-1-ethanol, 2-(8Z)-8-heptadecenyl-4,5-dihydro, 1H-Imidazole-1-ethanol, 2-(8Z)-8-heptadecenyl-4,5-dihydro, monoacetate salt, 1H-Imidazole-1-ethanol, -4,5-dihydro,-2-(9Z)-9-octadecenyl, 1H-Imidazole, 4,5-dihydro,-2-(9Z)-9-octadecenyl, oleyl hydroxyethyl imidazoline, 1H-Imidazole-1-ethanol, 4,5-dihydro-2-undecyl-, 1H-Imidazole-1-ethanol, 2(-8-heptadecenyl)-4,5-dihydro, 1-(2-hydroxyethyl)-2-tall oil alkyl-2-imidazoline, azelaic acid salt, 1H-Imidazole-1-ethanol, 2-heptadecyl-4,5-dihydro, 1H-Imidazole-1-ethanol, 2-nonyl-4,5-dihydro, 1H-Imidazole-1-ethanol, 4,5-dihydro-2-$C_{15-17}$-unsaturated alkyl derivatives, 1H-Imidazole-1-ethanol, 4,5-dihydro-2-norcoco alkyl derivatives, 1H-Imidazole-1-ethanol, 4,5-dihydro-2-nortall-oil alkyl derivatives, reaction product of 4,5-dihydro-2-nonyl 1H-Imidazole-1-ethanol, and 4,5-dihydro-2-heptyl 1H-Imidazole-1-ethanol with 2-propenoic acid, 1-propane sulfonic acid, 3-chloro-2-hydroxy-mono sodium salt reaction products with 2-(8Z)-8-heptadecenyl-4,5-dihydro 1H-Imidazole-1-ethanol, chloroacetic acid sodium salt reaction products with 1H-Imidazole-1-ethanol, 4,5-dihydro-2-norcoco alkyl derivatives, and sodium hydroxide, 2-(8-heptadecenyl)-4,5-dihydro 1H-Imidazole-1-ethanamine, or the 9-octadecenoic acid compound with 2-(8-heptadecenyl)-4,5-dihydro 1H-Imidazole-1-ethanamine.

Unless otherwise noted, an "alkyl having up to 30 carbon atoms," as used herein, refers to a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl.

Unless otherwise noted, an "alkyl having 2 to 25 carbon atoms which is interrupted by oxygen or sulfur," refers to an alkyl having 2 to 25 carbon atoms which can be interrupted one or more times, for example, $CH_3$—O—$CH_2$—, $CH_3$—S—$CH_2$—, $CH_3$—O—$CH_2$ $CH_2$—O—$CH_2$—, $CH_3$—(O—$CH_2$ $CH_2$—)$_2$ O—$CH_2$—, $CH_3$—(O—$CH_2$ $CH_2$—)$_3$ O—$CH_2$— or $CH_3$—(O—$CH_2$ $CH_2$—)$_4$ O—$CH_2$—.

Unless otherwise noted, an "alkyl having 3 to 25 carbon atoms which is interrupted by oxygen or sulfur," as used herein, refers to an alkyl having 3 to 25 carbon atoms which can be interrupted one or more times, for example, $CH_3$—O—$CH_2$ $CH_2$—, $CH_3$—S—$CH_2$ $CH_2$—, $CH_3$—O—$CH_2$ $CH_2$—O—$CH_2$ $CH_2$—, $CH_3$—(O—$CH_2$ $CH_2$—)$_2$ O—$CH_2$ $CH_2$—, $CH_3$—(O—$CH_2$ $CH_2$—)$_3$ O—$CH_2$ $CH_2$— or $CH_3$—(O—$CH_2$ $CH_2$—)$_4$ O—$CH_2$ $CH_2$—.

Unless otherwise noted, an "alkenyl having 2 to 24 carbon atoms," as used herein, refers to a branched or unbranched radical, for example, vinyl, propenyl, 2-butenyl, 3-butenyl isobutenyl, n-2,4-pentadienyl, 3-methyl-2-butenyl, n-2-octenyl, n-2-dodecenyl, isododecenyl, oleyl, n-2-octadecenyl or n-4-octadecenyl.

$C_4$-$C_{15}$ Cycloalkyl, or $C_5$-$C_{15}$ cycloalkyl, which is unsubstituted or substituted by $C_1$-$C_4$ alkyl and/or carboxyl and which preferably contains 1 to 3, or 1 or 2, branched or unbranched alkyl group radicals and/or 1 or 2 carboxyl groups, can be, for example, cyclopentyl, methylcyclopentyl, dimethylcyclopentyl, cyclohexyl, 2-carboxycyclohexyl, 3-carboxycyclohexyl, methylcyclohexyl, dimethylcyclohexyl, trimethylcyclohexyl, tert-butylcyclohexyl, cycloheptyl, cyclooctyl or cyclododecyl.

$C_5$-$C_{15}$ Cycloalkenyl which is unsubstituted or substituted by $C_1$-$C_4$ alkyl and/or carboxyl and which preferably contains 1 to 3, or 1 or 2, branched or unbranched alkyl group radicals and/or 1 or 2 carboxyl groups, can be, for example, cyclopentenyl, methylcyclopentenyl, dimethylcyclopentenyl, cyclohexenyl, 2-carboxycyclohexenyl, 3-carboxycyclohexenyl, 2-carboxy-4-methylcyclohexenyl, methylcyclohexenyl, dimethylcyclohexenyl, trimethylcyclohexenyl, tert-butylcyclohexenyl, cycloheptenyl, cyclooctenyl or cyclododecenyl. It is preferably $C_5$-$C_{12}$ cycloalkenyl, in particular $C_5$-$C_{18}$ cycloalkenyl, e.g., cyclohexenyl.

$C_{13}$-$C_{26}$ Polycycloalkyl can be, for example, the $C_{13}$-$C_{26}$ polycycloalkyls which occur in naphthenic acid [J. Buckingham, Dictionary of Organic Compounds, Vol. 4, page 4152, 5th Edition (1982)].

$C_7$-$C_9$ Phenylalkyl which is unsubstituted or substituted on the phenyl radical by $C_1$-$C_4$ alkyl and which preferably contains 1 to 3, in particular 1 or 2, branched or unbranched alkyl group radicals can be, for example, benzyl, α-methylbenzyl, α,α-dimethylbenzyl 2-phenylethyl, 2-methylbenzyl, 3-methylbenzyl, 4-methylbenzyl, 2,4-dimethylbenzyl, 2,6-dimethylbenzyl or 4-tert-butylbenzyl. Benzyl is preferred.

A 5- or 6-membered heterocyclic ring which is unsubstituted or substituted by $C_1$-$C_4$ alkyl, $C_1$-$C_4$ alkoxy, halogen or carboxyl and which preferably contains 1 to 3, in particular 1 or 2, branched or unbranched alkyl or alkoxy group radicals, and preferably 1 to 3, in particular 1 or 2, heteroatoms from the group consisting of nitrogen, oxygen and sulfur can be, for example, thienyl, 2-methylthienyl, 3-chlorothienyl, 3-methoxythienyl, tetrahydrofuranyl, furyl, pyrrolidinyl, 1-methylpyrrolidinyl, pyrrolyl, thiazolyl, isothiazolyl, imidazolyl, carboxyimidazolyl, triazolyl, tetrazolyl, oxazolyl, isoxazolyl, pyridyl, piperidinyl, morpholinyl, pyrazinyl, carboxypyrazinyl, piperazinyl, triazinyl or 2,6-dimethoxytriazonyl.

A 5- or 6-membered heterocyclic ring which is unsubstituted or substituted by $C_1$-$C_4$ alkyl, $C_1$-$C_4$ alkoxy, halogen or carboxy and is benzo-fused, which preferably contains 1 to 3, in particular 1 or 2, branched or unbranched alkyl or alkoxy group radicals and preferably 1 to 3, in particular 1 or 2, heteroatoms from the group consisting of nitrogen, oxygen and sulfur can be, for example, benzothiazolyl, 5-chlorobenzothiazolyl, 5-methoxybenzothiazolyl, 5-methylbenzothiazolyl, benzoimidazolyl, benzooxazolyl, benzoisothiazolyl or benzothienyl.

Unless otherwise noted, an "alkoxy having up to 18 carbon atoms," as used herein, refers to a branched or unbranched radical such as, for example, methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. $C_1$-$C_2$ alkoxy is preferred, in particular $C_1$-$C_{10}$ alkoxy, e.g. $C_1$-$C_8$ alkoxy.

$C_2$-$C_{18}$ Alkoxy which is interrupted by oxygen or sulfur can be, for example, $CH_3$—O—$CH_2$ $CH_2$ O—, $CH_3$—S—$CH_2$ $CH_2$ O—, $CH_3$—O—$CH_2$ $CH_2$—O—$CH_2$ $CH_2$ O—, $CH_3$—S—$CH_2$ $CH_2$—S—$CH_2$ $CH_2$ O—, $CH_3$—S—$CH_2$ $CH_2$—O—$CH_2$ $CH_2$ O—$CH_3$—(O—$CH_2$ $CH_2$—)$_2$ O—$CH_2$ $CH_2$ O—, $CH_3$—(O—$CH_2$ $CH_2$—)$_3$ O—$CH_2$ $CH_2$ O— or $CH_3$—(O—$CH_2$ $CH_2$—)$_4$ O—$CH_2$ $CH_2$—.

Phenyl or naphthyl substituted by $C_1$-$C_4$ alkyl, which preferably contains 1 to 3, in particular 1 or 2, alkyl groups, can be, for example, o-, m- or p-methylphenyl 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

$C_{10}$-$C_{12}$ Naphthylalkyl which is unsubstituted or substituted on the naphthyl ring system by $C_1$-$C_4$ alkyl and which preferably contains 1 to 3, in particular 1 or 2, branched or unbranched alkyl group radicals can be, for example, naphthylmethyl, α-methylnaphthylmethyl, α,α-dimethylnaphthylmethyl, naphthylethyl, 2-methyl-1-naphthylmethyl, 3-methyl-1-naphthylmethyl, 4-methyl-1-naphthylmethyl, 2,4-dimethyl-1-naphthylmethyl, 2,6-dimethyl-1-naphthylmethyl or 4-tert-butyl-1-naphthylmethyl.

An unsubstituted or $C_1$-$C_4$ alkyl-substituted $C_5$-$C_{12}$ cycloalkylidene ring which preferably contains 1 to 3, in particular 1 or 2, branched or unbranched alkyl group radicals can be, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene, cyclooctylidene, cyclodecylidene or cyclododecylidene. Preference is given to cyclohexylidene and tert-butylcyclohexylidene.

Unless otherwise noted, a "halogen," as used herein, refers to chlorine, bromine or iodine, for example, chlorine.

Unless otherwise noted, a "haloalkyl having up to 25 carbon atoms," as used herein, refers to a branched or unbranched radical such as, for example, chloromethyl, chloroethyl, chloropropyl, chlorobutyl or 3-chloro-1-butyl.

Unless otherwise noted, an "alkylthio having up to 18 carbon atoms," as used herein, refers to a branched or unbranched radical such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Alkylthio having 1 to 12 carbon atoms is preferred, in particular 1 to 8 carbon atoms, e.g. 1 to 6 carbon atoms. $C_1$-$C_4$ Alkyl-substituted phenoxy or naphthoxy, which preferably contains 1 to 3, in particular 1 or 2, alkyl groups, can be for example o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy, 2,6-diethylphenoxy, 1-methylnaphthoxy, 2-methylnaphthoxy, 4-methylnaphthoxy, 1,6-dimethylnaphthoxy or 4-tert-butylnaphthoxy.

$C_7$-$C_9$ Phenylalkoxy which is unsubstituted or substituted on the phenyl ring by $C_1$-$C_4$ alkyl, and preferably contains 1 to 3, in particular 1 or 2, branched or unbranched allyl group radicals, can be for example benzyloxy, 2-phenylethoxy, 2-methylbenzyloxy, 3-methylbenzyloxy, 4-methylbenzyloxy, 2,4-dimethylbenzyloxy, 2,6-dimethylbenzyloxy or 4-tert-butylbenzyloxy. Benzyloxy is preferred.

$C_{10}$-$C_{12}$ Naphthylalkoxy which is unsubstituted or substituted on the naphthyl ring system by $C_1$-$C_4$ alkyl, and preferably contains 1 to 3, in particular 1 or 2, branched or unbranched alkyl group radicals can be for example naphthylmethoxy, naphthylethoxy, 2-methyl-1-naphthylmethoxy, 3-methyl-1-naphthylmethoxy, 4-methyl-1-naphthylmethoxy, 2,4-dimethyl-1-naphthylmethoxy, 2,6-dimethyl-1-naphthylmethoxy or 4-tert-butyl-1-naphthylmethoxy.

Unless otherwise noted, a "$C_1$-$C_{18}$ alkylene," as used herein, refers to a branched or unbranched radical such as, for example, methylene, ethylene, propylene, tetramethylene, pentamethylene, hexamethylene, heptamethylene, octamethylene, decamethylene, dodecamethylene or octadecamethylene.

Unless otherwise noted, a "$C_2$-$C_{18}$ alkylene which is interrupted by oxygen or sulfur," as used herein, refers to a $C_2$-$C_{18}$ alkylene which can be interrupted one or more times, for example —$CH_2$—O—$CH_2$—, —$CH_2$—S—$CH_2$—, —$CH_2$—NH—$CH_2$—, —$CH_2$—O—$CH_2$ $CH_2$—O—$CH_2$—, —$CH_2$—(O—$CH_2$ $CH_2$—)$_2$ O—$CH_2$—, —$CH_2$—(O—$CH_2$ $CH_2$—)$_3$ O—$CH_2$—, —$CH_2$—(O—$CH_2$ $CH_2$—)$_4$ O—$CH_2$— or —$CH_2$ $CH_2$—S—$CH_2$ $CH_2$—.

Unless otherwise noted, a "$C_4$-$C_{18}$ alkylene interrupted by oxygen, sulfur, or an optionally alkyl-substituted nitrogen," as used herein, refers to a $C_4$-$C_{18}$ alkylene, which can be interrupted one or more times, for example —$CH_2$ $CH_2$—NH—$CH_2$ $CH_2$—, —$CH_2$ $CH_2$—N($CH_3$)—$CH2$ $CH_2$—, —$CH_2$ $CH_2$—NH—$CH_2$ $CH_2$ $CH_2$—, —$CH_2$ $CH_2$—S—$CH_2$ $CH_2$—, —$CH_2$ $CH_2$—O—$CH_2$ $CH_2$—O—$CH_2$ $CH_2$—, —$CH_2$ $CH_2$ NH—$CH_2$ $CH_2$—NH—$CH_2$ $CH_2$—, —$CH_2$ $CH_2$—(O—$CH_2$ $CH_2$—)$_2$ O—$CH_2$ $CH_2$—, —$CH_2$ $CH_2$—(O—$CH_2$ $CH_2$—)$_3$ O—$CH_2$ $CH_2$— or —$CH_2$ $CH_2$—(O—$CH_2$ $CH_2$—)$_4$ O—$CH_2$ $CH_2$—.

$C_2$-$C_{18}$ alkenylene can be, for example vinylene, methylvinylene, octenylethylene or dodecenylethylene. $C_2$-$C_{12}$ Alkenylene is preferred, especially $C_2$-$C_8$ alkenylene. $C_2$-$C_{18}$ alkenylene can be for example—2-propynylene, 2-butynylene, 2-pentynylene, 2-hexynylene, 3-hexynylene, 3-heptynylene, 2-decynylene, 4-decynylene or 8-octadecynylene.

Alkylidene having 2 to 20 carbon atoms can be for example ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene.

Phenylallidene having 7 to 20 carbon atoms can be for example benzylidene, 2-phenylethylidene or 1-phenyl-2-hexylidene.

Unless otherwise indicated, a "$C_5$-$C_9$ cycloalkylene," as used herein, refers to a saturated hydrocarbon group having two free valences and at least one ring unit and can be, for example, cyclopentylene, cyclohexylene, cycloheptylene or cyclooctylene. Cyclohexylene is preferred.

An Unsubstituted or $C_1$-$C_4$ alkyl-substituted phenylene or naphthylene can be, for example, 1,2-, 1,3-, or 1,4-phenylene; or 1,2-, 1,3-, 1,4-, 1,6-, 1,7-, 2,6-, or 2,7-naphthylene. 1,4-Phenylene is preferred.

In certain embodiments, the metal amidine complexes described herein are prepared by heating 1 mole of metal carboxylate with 4 moles of amidine in methanol. The mixture is held at about 50° C. for about 2 hours or until it becomes a clear solution. The clear solution is filtered and dried. In some embodiments, the dried catalyst is then optionally blended with fumed silica. A suitable fumed silica is Sipernat 50S from Degussa Corporation.

4.2 Epoxy Coating Compositions and Their Uses

In certain embodiments, provided herein is an epoxy composition comprising a polyepoxide, a polyacid curing agent, and one or more catalyst composition comprising a metal amidine complex and one or more second compounds, as described herein. In certain embodiments, the epoxy composition is film-forming. In certain embodiments, the polyepoxide is an epoxy-containing acrylic polymer, an epoxy condensation polymer (e.g., a polyglycidyl ether of an alcohol and/or a phenol), or a polyepoxide monomer or oligomer. In particular embodiment, the polyepoxide is an epoxy-containing acrylic polymer.

In certain embodiments, the one or more catalyst composition is present in the amount of 0.05 to about 10 wt. %, about 0.1 to about 10 wt. %, about 0.5 to about 10 wt. %, about 1 to about 10 wt. %, about 2 to about 8 wt. %, about 2 to about 6 wt. %, about 2 to about 4 wt. %, or about 4 to about 8 wt. %, based on the total weight of the coating composition.

In certain embodiments, the polyepoxide is a polylglycidyl ether of bisphenol A or F or NOVOLAK™, or phenol formaldehyde resins with a molecular weight of about 350 to about 10000, more specifically from about 380 to about 4000. These resins may be used as solids or viscous liquids. In certain embodiments, diglycidyl esters of di and polycarboxylic acids are used. In other embodiments, glycidyl functional polymers are used, including a polymer of the glycidyl ester of methacrylic acid, epoxidized oil, cycloaliphatic epoxies, or triglycidyl isocyanurate. In certain embodiments, the polyepoxide is a cycloaliphatic epoxy, for example 3,4-epoxycyclohexylmethyl 3,4-epoxycyclohexanecarboxylate, spiro[1,3-dioxane-5,3'-[7]oxabicyclo[4.1.0]heptane], 2-(7-oxabicyclo[4.1.0]hept-3-yl), 3,4-epoxycyclohexyl)methyl 3,4-epoxycyclohexylcarboxylate, 1,2-epoxy-4-(epoxyethyl)cyclohexane, 7-Oxabicyclo[4.1.0]heptane-3,4-dicarboxylic acid, bis(oxiranylmethyl) ester, 1,3,5-triglycidyl isocyanurate (TGIC), epoxidized soybean oil, or epoxidized linseed oil.

In certain embodiments, the epoxy-containing acrylic polymer is a copolymer of an ethylenically unsaturated monomer having at least one epoxy group and at least one polymerizable ethylenically unsaturated monomer which is free of epoxy groups. In certain embodiments, the ethylenically unsaturated monomer having at least one epoxy group is one having a 1,2-epoxy group (e.g., glycidyl acrylate, glycidyl methacrylate, and/or allyl glycidyl ether). In certain embodiments, the ethylenically unsaturated monomer which is free of epoxy groups is an alkyl ester of acrylic and methacrylic acid containing from 1 to 20 carbon atoms in the alkyl group. In other embodiments, the ethylenically unsaturated monomer which is free of epoxy groups is a vinyl aromatic compound (e.g., styrene and derivatives thereof), a vinyl nitrile (e.g., acrylonitrile and derivatives thereof), a vinyl and vinylidene halide, a vinyl ester, or mixtures thereof. In certain embodiments, the ethylenically unsaturated monomer which is free of epoxy groups does not comprise a carboxylic acid group.

In certain embodiments, the ethylenically unsaturated monomer having at least one epoxy group is present in amounts of from about 5 to about 60, or from about 20 to about 50 percent by weight of the total monomers used in preparing the epoxy-containing acrylic polymer. In certain embodiments, the ethylenically unsaturated monomer which is free of epoxy groups comprises one or more alkyl ester of acrylic and methacrylic acid, in an amount from about 40 to about 95 percent, or from about 50 to about 80 percent by weight of the total monomers are the alkyl esters of acrylic and methacrylic acid.

In certain embodiments, the epoxy-containing acrylic polymer is prepared by mixing the ethylenically unsaturated monomer having at least one epoxy group and the at least one polymerizable ethylenically unsaturated monomer which is free of epoxy groups and reacting the mixture, for example, by conventional free radical initiated organic solution polymerization.

In certain embodiments, the epoxy-containing acrylic polymer has a number average molecular weight between about 1000 and about 20,000, or between about 1000 and about 10,000, or between about 1000 and about 5000. In certain embodiments, the molecular weight is determined by gel permeation chromatography using a polystyrene standard. In determining molecular weights in these embodiments, it is not the actual molecular weights which are measured but an indication of the molecular weight as compared to polystyrene. The values which are obtained are commonly referred to as polystyrene numbers. However, as used herein, they are molecular weights.

In certain embodiments, the polyepoxide is an epoxy condensation polymer, that is, a polymer having a 1,2-epoxy equivalency greater than 1, for example from about 1 to about 3.0. In various embodiments, the polyepoxide is a polyglycidyl ether of a polyhydric phenol and/or an aliphatic alcohols. Sich a polyepoxide can be produced by etherification of the polyhydric phenol or aliphatic alcohol with an epihalohydrin such as epichlorohydrin in the presence of alkali.

In certain embodiments, the polyhydric phenol is 2,2-bis (4-hydroxyphenyl)propane (bisphenol A) or 1,1-bis(4-hydroxyphenyl)ethane a bis(4-hydroxyphenyl)propane. In certain embodiments, the aliphatic alcohol is ethylene glycol, diethylene glycol, 1,2-propylene glycol or 1,4-butylene glycol. In certain embodiments, the aliphatic alcohol is a cycloaliphatic polyol, for example 1,2-cyclohexanediol, 1,4-cyclohexanediol, 1,2-bis(hydroxymethyl)cyclohexane, or hydrogenated bisphenol A.

In other embodiments, the polyepoxide can be one of those described in U.S. Pat. No. 4,102,942 at column 3, lines 1-16, incorporated by reference herein. In particular embodiments, the polyepoxide is 3,4-epoxycyclohexylmethyl 3,4-epoxycyclohexanecarboxylate or bis(3,4-epoxy-6-methylcyclohexylmethyl) adipate. In certain embodiments, the polyepoxide is an epoxy-containing acrylic polymer. In such embodiments, the resultant product has a preferable combination of coating properties, i.e., smoothness, gloss, durability, and solvent resistance. Such resultant polymers are useful, for example, in the formulation of clear coats for color-plus-clear applications.

In certain embodiments, the polyepoxide is one having a glass transition temperature less than about 50° C., for example less than about 30° C. The glass transition temperature ($T_g$) is described in PRINCIPLES OF POLYMER CHEMISTRY, Flory, Cornell University Press, Ithaca, N.Y., 1953, pages 52-57. In certain embodiments, the $T_g$ is calculated as described by Fox in Bull. Amer. Physic. Soc., 1, 3, page 123 (1956), incorporated by reference herein. In certain embodiments, the $T_g$ is determined experimentally, for example, by using a penetrometer such as a DuPont 940 Thermomedian Analyzer.

In a specific embodiment, the polyepoxide is a mixture of epoxy-containing acrylic polymer (e.g., as described above) and a lower molecular weight polyepoxide, such as an epoxy condensation polymer (e.g., as described above) having a molecular weight less than about 800.

In certain embodiments, the polyepoxide is present in the composition in an amount from about 10 to about 90, or from about 25 to about 80 weight percent based on total weight of resin solids. In embodiments where a lower molecular weight polyepoxide is used (e.g., a molecular weight less than about 800), it is present in an amount from about 1 to about 40, or from about 5 to about 30 percent by weight based on total weight of resin solids.

In certain embodiments, the polyacid curing agent includes two or more acid groups per molecule. The acid groups are reactive with the polyepoxide to form a crosslinked coating as indicated by its resistance to organic solvent. In certain embodiments, the acid functionality is a carboxylic acid or a sulfonic acid. In various embodiments, the polyacid curing agent includes carboxylic acid group-containing polymers such as acrylic polymers, polyesters, and polyurethanes, as well as oligomers such as ester group-containing oligomers and monomers. In a particular embodiment, the polyacid curing agent is a carboxyl-terminated material having at least two carboxyl groups per molecule. In certain embodiments, the polyacid curing agent has a $T_g$ less than 30° C. Such low $T_g$ materials can, for example, enable the formation of high solids liquid compositions. Higher $T_g$ materials require the use of more solvent.

In certain embodiments, the polyacid curing agent is adipic acid; glutaric acid; glutaric anhydride; sebacic acid; 1,10 decanedioic acid; fumaric acid; maleic acid and maleic anhydride; succinic acid; phthalic acid and phthalic anhydride; 8,9,10-trinorborn-5-ene-2,3-dicarboxylic acid and 8,9,10-trinorborn-5-ene-2,3-dicarboxylic anhydride; cyclohexene-1,2-dicarboxylic acid; diphenyl-2,2'-dicarboxylic acid; methylnorbornene-2,3-dicarboxylic anhydride; cyclohexene-1,2-dicarboxylic acid; tetrahydrophthalic anhydride; 5-methyltetrahydrophthalic anhydride; octahydro-4,7-methano-1H-indene-5,-dicarboxylic acid; 1,2-cyclohexanedicarboxylic acid; a dimeric fatty acid; an alkenyl succinic acid or anhydride; a dicarboxylic acid anhydride such as succinic or glutaric anhydride; an alkenylsuccinate with an alkenyl group from C6 to C18; an aromatic anhydride such as o-phthalic anhydride; trimellitic anhydride; or a linear anhydride of a diacid.

In embodiments where the polyacid curing agent is an acrylic polymer, copolymers of (a) an ethylenically unsaturated monomer containing at least one carboxylic acid and (b) a different ethylenically unsaturated monomer which is free from carboxylic acid groups can be used. In certain embodiments, the acrylic polymer preferably has an acid number from about 30 to about 150, or from about 60 to about 120.

In certain embodiments, the (a) ethylenically unsaturated monomer containing at least one carboxylic acid is acrylic acid, methacrylic acid, maleic acid or a partial ester of maleic acid. In certain embodiments, the (b) different ethylenically unsaturated monomer which is free from carboxylic acid groups comprises the group

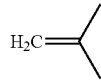

for example styrene, an alpha-substituted lower alkyl styrene (e.g., alpha-methylstyrene), or an alkyl ester of an acrylic or methacrylic acids (e.g., methyl methacrylate, methyl and ethyl acrylate, or mixtures thereof).

In certain embodiments, the copolymer is prepared in conventional fashion, e.g., by heating monomers (a) and (b) at elevated temperatures, for example from about 90 to about 140° C., or from about 115° C. to about 125° C. The reaction may be carried out in bulk or in solution using such conventional solvents as aromatic hydrocarbons, for example benzene, toluene and xylene, or alcohols (e.g. butyl alcohol or monoalkyl ethers of ethylene glycol) or the like. In certain embodiments, the polymerization is carried out in the presence of a polymerization catalyst, for example, peroxides such as benzoyl peroxide, di-tertiarybutyl-peroxide, di-cumene peroxide and methyl-ethyl ketone peroxide, or other catalysts of the free-radical type.

In certain embodiments, the carboxylic acid group-containing acrylic polymer will have a relatively low molecular weight, having have number average molecular weights as determined by gel permeation chromatography using a polystyrene standard of from about 500 to about 5000, or from about 700 to about 3000. In certain embodiments, carboxylic acid group-containing acrylic polymer. In certain embodiments, the carboxylic acid group-containing acrylic polymer has a polydispersity value less than about 4, for example from about 2 to about 3. By "polydispersity value" is meant the ratio of the weight average molecular weight to the number average molecular weight, each being determined by gel permeation chromatography using a polystyrene standard as described above.

In certain embodiments, the carboxylic acid group-containing acrylic polymer is obtained by polymerizing a carboxyl functional monomer such as acrylic, methacrylic, maleic, fumaric, itaconic or the half ester of maleic or fumaric with acrylic or styrene or acrylonitrile monomer. In certain embodiments, the carboxylic acid group-containing acrylic polymer is one with anhydride groups such as the copolymers of acrylic monomers with maleic or itaconic anhydride. Examples for tri carboxylic acids/anhydrides are 1-propene-1,2,3-tricarboxylic acid; 1,2,4-benzenetricarboxylic acid; an adduct of abietic acid with fumaric acid or maleic anhydride; trimellitic anhydride; and citric acid. Examples for monoacids are the $C_{12}$ to $C_{18}$ fatty acids saturated and unsaturated.

The acid functional acrylic polymer impart sag control to the final product. Certain clear film-forming compositions are high solids compositions and have a tendency to sag when applied to vertical surfaces. However, the acid functional acrylic polymers used with the catalyst described herein surprisingly provides sag control to the compositions.

In certain embodiments, the acid functional acrylic polymer is not the sole polyacid curing agent, and is used with the other polyacid curing agent, for example the half-ester described hereinbelow.

In other embodiments, the polyacid curing agent is an acid group-containing polyester. In certain embodiments, such polyester is formed by reacting a polyol with a polycarboxylic acid or anhydride.

With regard to the polyol-polycarboxylic acid or polycarboxylic acid anhydride, various polyols can be used including ethylene glycol, neopentyl glycol, glycerol, pentaerythritol, trimethylolpropane, and the like. In pother embodiments, acid group-containing polyols such as dimethylolpropionic acid can be used.

In certain embodiments, polycarboxylic acids may be employed, for example dicarboxylic acids such as phthalic acid, tetrahydrophthalic acid, hexahydrophthalic acid, maleic acid, itaconic acid, adipic acid, sebacic acid, or the like. In certain embodiments, anhydrides of the polycarboxylic acids may be used.

The preparation of acid group-containing polyesters is well known in the art and usually involves preparation in organic solvent with sufficient acid group-containing ingredients to form an acid group-containing material at the completion of the reaction. A sufficient excess of the acid component is employed in forming the polymers to provide an acid value of from about 10 to about 120, or from about 30 to about 60.

In certain embodiments, ester group-containing oligomers can be used, for example half-esters (e.g., those formed from reacting polyols and 1,2-acid anhydrides). In certain embodiments, half-esters result in the formulation of high solids fluid compositions while maintaining outstanding properties such as gloss and distinctness of image.

In certain embodiments, the half-ester is obtained by reaction between a polyol and a 1,2-acid anhydride under conditions sufficient to ring open the anhydride forming the half-ester with substantially no polyesterification occurring. In certain embodiments, such reaction products are of relatively low molecular weight with low polydispersity values and provide lower volatile organic contents in the coating composition while still providing for excellent properties in the resultant coating. By substantially no polyesterification occurring it is meant that the carboxyl groups of the anhydride are not esterified by the polyol in a recurring manner. By this is meant that less than about 10, for example less than about 5 percent by weight polyester is formed.

Two reactions may occur in combining the anhydride and the polyol together under suitable reaction conditions. The desired reaction mode involves ring opening the anhydride ring with hydroxyl, i.e.

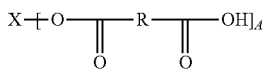

where X is the residue of the polyol after reaction with the 1,2-dicarboxylic acid anhydride, R is an organic moiety associated with anhydride, and A is equal to at least 2. Subsequently, carboxyl groups formed by opening of the anhydride ring may react with hydroxyl groups to give off water via a condensation reaction. This latter reaction is not desired since it can lead to a polycondensation reaction resulting in products with higher molecular weights To achieve the desired reaction, the 1,2-acid anhydride and polyol are contacted together usually by mixing the two ingredients together in a reaction vessel. In certain embodiments, the reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation eliminating water which would have to be removed by distillation. Under these conditions this would promote undesired polyesterification. In certain embodiments, the reaction temperature is preferably low, that is, no greater than about 135° C., for example less than about 120° C., or within the range of about 70° to about 135° C., or from about 90° to about 120° C. Temperatures greater than 135° C. are undesirable because they promote polyesterification, whereas temperatures less than 70° C. are undesirable because of sluggish reaction. The time of reaction can vary somewhat depending principally upon the temperature of reaction. In certain embodiments, the reaction time will be from as low as about 10 minutes to as high as about 24 hours.

In certain embodiments, the equivalent ratio of anhydride to hydroxy on the polyol is at least about 0.8:1 (the anhydride being considered monofunctional) to obtain maximum conversion to the desired half-ester. In other embodiments, ratios less than 0.8:1 are used be used; such ratios result in increased formation of half-esters.

In certain embodiments, the anhydride which can be used in the formation of the polyesters is one which, exclusive of the carbon atoms and the anhydride moiety, contains from about 2 to 30 carbon atoms—for example, aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents include chloro, alkyl and alkoxy. In certain specific embodiments, the anhydride is succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, an alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride, or maleic anhydride.

In certain embodiments, the polyol which can be used is one which contains from about 2 to about 20 carbon atoms, or from about 2 to about 10 carbon atoms for example diols, triols and mixtures thereof. In certain embodiments, the polyol is an aliphatic polyol such as ethylene glycol, 1,2-propanediol, 1,3-propanediol, 1,4-butanediol, 1,5-pentanediol, glycerol, 1,2,3-butanetriol, 1,6-hexanedial, neopentyl glycol, diethylene glycol, dipropylene glycol, 1,4-cyclohexanedimethanol, trimethylolpropane, 2,2,4-trimethylpentane-1,3-diol, pentaerythritol, or tetrol. In certain embodiments, the polyol is an aromatic polyols, such as bisphenol A and bis(hydroxymethyl) xylene.

In certain embodiments, the polyacid curing agent is a mono, di or poly glycidyl ester (e.g., the reaction products of a mono, di or polycarboxylic acid with epichlorohydrin); a glycidyl ether of an aliphatic ether of a diol, triol and/or polyol (e.g., 1,2,3-propanetriol glycidyl ether); an alkyl ($C_{10}$-$C_{16}$) glycidyl ether; a lauryl glycidyl ether; a glycerin 1,3-diglycidyl ether; an ethylene diglycidyl ether; a polyethylene glycol bis(glycidyl ether); a 1,4-butanediol diglycidyl ether; a 1,6-hexanediglycidyl ether; a bis(2,3-epoxypropyl)ether; a homo or copolymer of an allyl glycidyl ether; or an ethoxylated alcohol($C_{12}$-$C_{14}$) glycidyl ether. In certain embodiments, the polyacid is a phenyl glycidyl ether, a p-t-butylphenol glycidyl ether, a hydroquinone diglycidyl ether, a glycidyl p-glycidyloxybenzoate, a p-nonylphenol glycidyl ether, or a glycidyl ether reaction product of 2-methyl phenol and formaldehyde polymer.

In certain embodiments, monomers containing at least two acid groups can be used, for example monomeric polycarboxylic acids containing from about 5 to about 20 carbon atoms and may be open chain, cyclic, saturated, unsaturated and aromatic acids. In certain embodiments, the monoer is succinic acid, adipic acid, azelaic acid, sebacic acid, hexahydrophthalic acid, maleic acid, cyclohexene-1,2-dicarboxylic acid, or phthalic acid.

In certain embodiments, the polyacid curing agent is present in the coating composition in an amount from about 10 to about 90, or from about 25 to about 75 percent by weight based on total weight of resin solids.

In certain embodiments, the polyepoxide-polyacid composition further comprise an anhydride, for example an anhydride which is a liquid at 25° C. The presence of such an anhydride in the compositions may provide an improved cure response. In certain embodiments, the anhydride is an alkyl-substituted hexahydrophthalic anhydrides wherein the alkyl group contains up to 7 carbons, or up to 4 carbons (such as methyl hexahydrophthalic anhydride) or dodecenyl succinic anhydride. In certain embodiments, the anhydride is present in an amount from about 0 to about 40, or from about 5 to about 25 percent by weight based on total weight of resin solids.

In certain embodiments, the equivalent ratio of carboxyl to epoxy in the clear film-forming compositions is such that there are from about 0.3 to about 3.0, or from about 0.8 to about 1.5 equivalents of carboxyl (anhydride being considered monofunctional) per equivalent of epoxy.

In certain embodiments, the ratio of the epoxy compound to the carboxyl or anhydride in the formulation is from about 0.5 to 1 to about 5 to 1. It will be understood that the ratio can be modified depending on the crosslinking density desired. For example, and without intending to be limited by mechanism in any way, the desired crosslinking density is achieved when the ratio of functional epoxy groups and carboxyl groups is 1 to 1 under ideal conditions. However, with most epoxy formulations some self-condensation of the epoxy groups takes place. For example, it is may be necessary to use an excess of epoxy groups to react all the carboxyl or anhydride groups so that a film with no free carboxyl groups are present, if excellent detergent or alkali resistance in a film is desired. However, if better adhesion and flexibility is desired, then the ratio can be adjusted so that some of the unreacted carboxyl groups remain.

Again without intending to be limited by mechanism, it is believed that the ratio of epoxy to carboxyl functional groups is important for primer applications where corrosion resistance is an important requirement. In such a formulation the level of epoxy resin can be reduced. The ratio of epoxy to carboxyl groups is also dependent on the functional groups in the reactant system. For example, if one reacts a carboxyl functional acrylic resin with a difunctional epoxy resin, it might be desirable to use an excess of carboxyl groups. If an acrylic resin which has a high molecular weight is used, it usually contains many carboxyl groups; a typical acrylic resin might have an acid number of 56 and a molecular weight of 20,000. In such a resin the average chain contains 20 carboxyl groups. To achieve crosslinking in such a system, theoretically three carboxyl groups have to be reacted to form an effective network. The epoxy in such a formulation might be diglycidyl ether of bisphenol A, a difunctional crosslinker. A person with skill in the coating art would therefore use an excess of carboxyl groups and a deficiency of epoxy groups to achieve a good network. Most crosslinking reactions do not go to completion. If the crosslinkers have reacted to an average to 75%, it indicates that some molecules of the crosslinking agents have completely reacted, with some molecules having reacted only at one end and some molecules having not reacted at all. By having an excess of carboxyl groups on the acrylic, one could assure a higher conversion of all the epoxy groups. This problem is typical in can coatings, where it is important to eliminate any unreacted epoxy resin to prevent any leaching of epoxy resin into the food.

In certain embodiments, the polyepoxide-polyacid compositions further comprises a silane functionality, which can be incorporated into the composition, for example, by using a reactive silane group-containing material (such as gamma-methacryloxypropyltrimethoxysilane or mercaptopropyltrimethoxysilane) in the preparation of the epoxy group-containing acrylic polymer. Such materials co-react with the polymerizing monomers or polymers forming a polymer with silane curing groups. In certain embodiments, the composition comprises a silane group-containing material, such as methyltrimethoxysilane.

In certain embodiments, the composition further comprises one or more of the following optional ingredients: an auxiliary curing agent such as aminoplasts, a plasticizer, an anti-oxidant, and a UV light absorbers. These ingredients typically are present in amounts of up to 25 percent by weight based on total resin weight.

In certain embodiments, the polyepoxide-polyacid composition is a liquid composition, for example a liquid composition formulated into a liquid high solids coating composition. These coating compositions contain greater than about 40, or greater than about 50 percent, or greater than about 60 percent by weight resin solids. The solids content is determined by heating the composition to 105-110° C. for 1 to 2 hours to drive off the volatile material.

In certain embodiments, the composition is applied to a base coated substrate by any of the conventional coating techniques such as brushing, spraying, dipping or flowing. In a particular embodiment, the composition is applied to a base coated substrate by spray applications. Any of the known spray techniques may be employed such as compressed air spraying, electrostatic spraying and either manual or automatic methods.

After application of the top coat composition to the base coat, the coated substrate is heated to cure the coating layers. In the curing operation, solvents are driven off and the film-forming material of the top coat and/or of the base coat is crosslinked with the aid of any crosslinking agents present. In certain embodiments, the heating or curing operation is carried out at a temperature in the range of from about 160° to about 350° F. (71°-177° C.). In certain embodiments, the thickness of the top coat is from about 0.5 to about 5 mm, or from about 1.2 to about 3 mm.

In certain embodiments, the epoxy formulation is cured at a temperature from about 100 to about 300° C., or from about 120 to about 250° C. In certain embodiments, the epoxy formulation is cured for a time period from about 2 seconds to about 4 hours, or from about 30 seconds to about 30 minutes.

In certain embodiments, the epoxy compositions provided herein are useful for producing coatings, adhesive films, or in casting or molding. For example, specific applications include use as corrosion resistant primers for automotive applications, or can or coil coatings, or automotive clear coats. The coatings can be applied as a high solids or a powder coating.

In certain embodiments, the metal amidine complex and second compound are, respectively, $Zn(1\text{-methylimidazole})_2(acetate)_2$ and DABCO; $Zn(1\text{-methylimidazole})_2(acetate)_2$ and zinc acetylacetonate; $Zn(1\text{-methylimidazole})_2(acetate)_2$ and dibutyltin dilaurate; $Zn(1\text{-methylimidazole})_2(acetate)_2$ and zirconium acetylacetonate; $Zn(1\text{-Methylimidazole})_2(2\text{-Ethylhexanoate})_2$ and a bismuth carboxylate; $Zn(1,1,3,3\text{-Tetramethylguanidine})_2(2\text{-Ethylhexanoate})_2$ and a bismuth carboxylate; $Zn(1\text{-methylimidazole})_2(acetate)_2$ and a bismuth carboxylate; $Zn(1\text{-methylimidazole})_2(acetate)_2$ and lithium neodecanoate; $Zn(2\text{-Ethylhexanoate})_2(acetate)_2$ and phenylmercuric acetate; $Zn(1\text{-methylimidazole})_2(acetate)_2$ and dinonylnaphthalene disulfonate; $Zn(1\text{-methylimidazole})_2(acetate)_2$ and 1,2-dimethylimidazole; or $Zn(1\text{-methylimidazole})_2(acetate)_2$ and 2-methylimidazole.

In related embodiments, provided herein is a method of coating a substrate, comprising applying to a substrate an epoxy composition comprising a polyepoxide, a polyacid curing agent, and one or more catalyst composition comprising a metal amidine complex and one or more second compounds, as described herein, and curing the coated substrate. Each of the components of the epoxy composition in this method are described more fully hereinabove.

4.3 Polyurethane Coating Compositions and Their Uses

In certain embodiments, provided herein is a polyurethane powder coating composition comprising:

Component A) a binder component which is solid below 40° C. and liquid above 130° C. and has an OH number of 25 to 200 and a number average molecular weight of 400 to 10,000;

Component B) a hardener which is solid below 40° C. and liquid above 125° C., contains uretdione groups and optionally free isocyanate groups and is prepared from aliphatic and/or cycloaliphatic diisocyanates; and Component C) one or more catalyst compositions comprising a metal amidine complex and a second compound, as described herein.

In certain embodiments, components A and B are present in amounts such that component B has about 0.6 to about 1.4 isocyanate groups for each hydroxyl group present in component A and the amount of component C is about 0.05 to about 10 wt. %, about 0.1 to about 10 wt. %, about 0.5 to about 10 wt. %, about 1 to about 10 wt. %, about 2 to about 8 wt. %, about 2 to about 6 wt. %, about 2 to about 4 wt. %, or about 4 to about 8 wt. %, based on the total weight of the coating composition.

In certain embodiments, this polyurethane powder coating is used for coating heat-resistant substrates.

In certain embodiments, component A is a binder containing hydroxyl groups known from powder coating technology, for example polyesters, polyacrylates or polyurethanes containing hydroxyl groups. Mixtures of such resins are also suitable. Examples of such resins, or mixtures thereof, can be found, for example, in U.S. Pat. No. 4,463,154 (to Disteldorf et al.) and U.S. Pat. No. 4,900,800 (to Halpaap et al.), each hereby incorporated by reference herein in their entirety.

In certain embodiments, component B is a hardener containing uretdione groups and optionally free isocyanate groups. The uretdiones can be derived from a broad range of isocyanates. In certain embodiments, the uretdione is derived from one or more of the following isocyanates: isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI), tetramethylxylylene diisocyanate (TMXDI), 4,4'-diisocyanatodicyclohexylmethane, or 1,3-diisocyanato-2(4)-methylcyclohexane. In particular embodiments, component B is derived from HDI or IPDI.

In certain embodiments, component C is a catalyst composition comprising a metal amidine complex and a second compound, where the metal amidine complex and the second compound are, respectively: $Zn(1\text{-methylimidazole})_2(\text{acetate})_2$ and DABCO; $Zn(1\text{-methylimidazole})_2(\text{acetate})_2$ and zinc acetylacetonate; $Zn(1\text{-methylimidazole})_2(\text{acetate})_2$ and dibutyltin dilaurate; $Zn(1\text{-methylimidazole})_2(\text{acetate})_2$ and zirconium acetylacetonate; $Zn(1\text{-Methylimidazole})_2(2\text{-Ethylhexanoate})_2$ and a bismuth carboxylate; $Zn(1,1,3,3\text{-Tetramethylguanidine})_2(2\text{-Ethylhexanoate})_2$ and a bismuth carboxylate; $Zn(1\text{-methylimidazole})_2(\text{acetate})_2$ and a bismuth carboxylate; $Zn(1\text{-methylimidazole})_2(\text{acetate})_2$ and lithium neodecanoate; $Zn(2\text{-Ethylhexanoate})_2(\text{acetate})_2$ and phenylmercuric acetate; $Zn(1\text{-methylimidazole})_2(\text{acetate})_2$ and dinonylnaphthalene disulfonate; $Zn(1\text{-methylimidazole})_2(\text{acetate})_2$ and 1,2-dimethylimidazole; or $Zn(1\text{-methylimidazole})_2(\text{acetate})_2$ and 2-methylimidazole.

In certain embodiments, the powder coating compositions further comprises one or more component D, additives known from powder coating technology. In various embodiments, component D optionally comprises one or more leveling agent (e.g., polyvinyl, polybutyl acrylate, or those based on polysilicones), one or more light stabilizer (e.g., a sterically hindered amines), one or more UV absorbers (e.g., a hydroxyphenyl triazine, a hydroxyphenyl benzotriazole, or a benzophenone), one or more pigment (e.g., titanium dioxide), one or more color stabilizer to counter yellowing due to overbake, (e.g., a trialkyl and/or triaryl phosphite, optionally containing inert substituents, such as triethyl phosphite, triphenyl phosphite and trisnonylphenyl phosphite), and/or other auxiliaries, as described, for example, in EP 669 353, incorporated herein by reference. In certain embodiment, the total amount of component(s) D ranges from about 0.05 to about 5% by weight, for example about 0.1, about 0.2, about 0.5, about 1, about 2, about 3, or about 4% by weight. In certain embodiments, fillers and/or pigments (e.g., titanium dioxide) are present in an amount of up to 50% by weight of the total composition.

In certain embodiments, the powder coating composition optionally further comprises component E, which are acid scavengers. In certain embodiments, the acid scavengers react at elevated temperatures with the excess acid functionality present in the starting hydroxyl functional binder. The acid scavengers are able to either neutralize the free carboxylic acid functionality left in the binder resin, or react with the free carboxyl group resulting in the formation of esters. In certain embodiments, the acid scavenger is an epoxy compound, a carbodiimide, a 2-oxazoline, or a trialkyl orthoformate. In specific embodiments, the epoxy compound acid scavenger is aglycidyl ether of bisphenol A or F or NOVOLAK™, or aphenol formaldehyde resin with a molecular weight of about 350 to about 10000, preferably between 380 and 4000. These resins may be used as solids or viscous liquids. In other embodiments, the acid scavenger is a mono-, di- and/or poly-glycidyl ester; the reaction product a mono-, di- and/or polycarboxylic acid with epichlorohydrin; a glycidyl ether or aliphatic ether of a diol, triol and/or polyol, such as 1,2,3-propanetriol glycidyl ether; an alkyl ($C_{10}$-$C_{16}$) glycidyl ether; a lauryl glycidyl ether; a glycerin 1,3-diglycidyl ether; an ethylene diglycidyl ether; apolyethylene glycol bis(glycidyl ether); a 1,4-butanediol diglycidyl ether; a 1,6-hexanediglycidyl ether; abis(2,3-epoxypropyl) ether; a homo or copolymers of an allyl glycidyl ether; or an ethoxylated alcohol($C_{12}$-$C_{14}$) glycidyl ether.

In certain embodiments, the acid scavenger is a glycidyl ether of bisphenol A and F or of phenol formaldehyde polymers. In certain embodiments, the acid scavenger is a phenyl glycidyl ether, a p-t-butylphenol glycidyl ether, a hydroquinone diglycidyl ether, a glycidyl p-glycidyloxybenzoate, a p-nonylphenol glycidyl ether, or a glycidyl ether reaction product of 2-methyl phenol and formaldehyde polymer.

In certain embodiments, the acid scavenger is a diglycidyl ester of a di- and/or polycarboxylic acids. In certain embodiments, the acid scavenger is a glycidyl functional polymer such as a glycidyl ester of methacrylic acid, a glycidyl ester of an epoxidized oil, a glycidyl ester of a cycloaliphatic epoxy compound, or triglycidyl isocyanurate. In certain embodiments, the cycloaliphatic epoxy compound is 3,4-epoxycyclohexylmethyl 3,4-epoxycyclohexanecarboxylate; spiro[1, 3-dioxane-5,3'-[7]oxabicyclo[4.1.0]heptane], 2-(7-oxabicyclo[4.1.0]hept-3-yl), 3,4-epoxycyclohexyl)methyl 3,4-epoxycyclohexylcarboxylate; 1,2-epoxy-4-(epoxyethyl)cyclohexane; 7-Oxabicyclo[4.1.0]heptane-3,4-dicarboxylic acid, bis(oxiranylmethyl) ester; 1,3,5-triglycidyl isocyanurate (TGIC); epoxidized soybean oil; or epoxidized linseed oil.

In certain embodiments, the acid scavenger is an epoxy compound, for example Araldite PT 810(TGIC), Araldite 912 (a mixture of terephthalic acid diglycidylester and trimellitic acid triglycidylester), Epikote 828 (Bisphenol A diglycidyl ether), or Erisys GE-30 (trimethylolpropane triglycidylether) (TMPTGE). In certain embodiments, the acid scavenger is an oxazoline, for example phenylenebisoxazoline, 2-methyl-2-oxazoline, 2-hydroxyethyl-2-oxazoline, 2-hydroxypropyl-2-oxazoline, or 5-hydroxypentyl-2-oxazoline. In certain embodiments, the acid scavenger is a carbodiimide, for example Picassian XL-701, a multifunctional polycarbodiimide. In certain embodiments, the acid scavenger is a single compound; in other embodiments the acid scavenger is a mixture of two or more compounds.

Component E) may be employed, for example, when acid groups are present in the powder coating composition. In certain embodiments where such acid groups are present in the powder coating composition, the amount of component E) in the composition is such that for each acid group there are about 0.1 to about 10 acid-scavenging units of component E). In certain embodiments, this ratio is about 0.2, about 0.5, about 1, about 2, about 3, about 5, or about 8 acid-scavenging units of component E) for each acid group. In certain embodiments, the composition comprises an additional catalyst, such as benzyltrimethylammonium chloride, for example to accelerated the acid scavenging reaction.

In certain embodiments, the finished powder coating composition is produced by intimately mixing components A, B, C, and optionally D and/or E in an edge runner mill and homogenizing the mixture in an extruder at temperatures up to a maximum of 130° C. After cooling, the extrudate is fractionated and ground with a pin mill to a particle size of <100 μm. In certain embodiments, the powder prepared in this way is applied with an electrostatic powder spraying unit at 60 kV to degreased iron panels which are then baked in a circulating air drying cabinet at temperatures between 150° and 200° C. for 20 minutes. Good solvent and chemical resistance may be obtained at considerably lower baking temperatures or shorter baking times than with comparable uretdione powder coating compositions formulated without the catalysts described herein. In addition, the cured films may be non-yellowing.

In related embodiments, provided herein is a method of coating a substrate, comprising applying to a substrate a polyurethane powder coating composition as described hereinabove, and curing the coated substrate. Each of the components of the polyurethane powder coating composition are described more fully hereinabove.

Polyurethane Electrocoating Compositions and Their Uses

In certain embodiments, provided herein is an electrocoating composition comprising (a) an active hydrogen-containing resin; (b) a capped polyisocyanate curing agent; and (c) a catalyst composition comprising a metal amidine complex and one or more second compounds, as described herein. In certain embodiments, component (c) is present in a total amount of from about 0.5 to about 10 parts, about 0.5 to about 5 parts, about 0.5 to about 4 parts, about 0.5 to about 3 parts, or about 0.5 to about 2 parts per 100 parts by weight of the resin solid content in the electrocoating composition.

In certain embodiments, component (c) is a catalyst composition comprising a metal amidine complex and a second compound, where the metal amidine complex and the second compound are, respectively: $Zn(1\text{-methylimidazole})_2(acetate)_2$ and DABCO; $Zn(1\text{-methylimidazole})_2(acetate)_2$ and zinc acetylacetonate; $Zn(1\text{-methylimidazole})_2(acetate)_2$ and dibutyltin dilaurate; $Zn(1\text{-methylimidazole})_2(acetate)_2$ and zirconium acetylacetonate; $Zn(1\text{-Methylimidazole})_2(2\text{-Ethylhexanoate})_2$ and a bismuth carboxylate; $Zn(1,1,3,3\text{-Tetramethylguanidine})_2(2\text{-Ethylhexanoate})_2$ and a bismuth carboxylate; $Zn(1\text{-methylimidazole})_2(acetate)_2$ and a bismuth carboxylate; $Zn(1\text{-methylimidazole})_2(acetate)_2$ and lithium neodecanoate; $Zn(2\text{-Ethylhexanoate})_2(acetate)_2$ and phenylmercuric acetate; $Zn(1\text{-methylimidazole})_2(acetate)_2$ and dinonylnaphthalene disulfonate; $Zn(1\text{-methylimidazole})_2(acetate)_2$ and 1,2-dimethylimidazole; or $Zn(1\text{-methylimidazole})_2(acetate)_2$ and 2-methylimidazole.

In certain embodiments, the active hydrogen-containing ionic resin is anionic or cationic. Without being limited in any way, it is believed that cationic resins usually provide superior corrosion resistance compared to anionic resins. In certain embodiments, the active hydrogens associated with the ionic resins are those which are reactive with isocyanate groups, for example hydroxyl, primary amino, secondary amino, and thiol groups, including mixtures thereof. In certain embodiments, the active hydrogen-containing resin is a cation resin having amine salt groups, for example acid-solubilized reaction products of polyepoxides and primary or secondary amines, such as those described in U.S. Pat. Nos. 3,663,389; 3,922,253; 3,984,299; 3,947,388; 3,947,339; and 4,031,050, herein incorporated by reference in their entirety.

In certain embodiments, the cation resin having amine salt groups is (i) an addition product between a polyepoxide compound and a primary mono- or polyamine, a secondary mono- or polyamine, or a primary and secondary mixed polyamine (see, for example, U.S. Pat. No. 3,984,299, incorporated by reference herein); (ii) an addition product between a polyepoxide compound and a secondary mono- or polyamine having a primary amino group converted into a ketimine form (see, for example U.S. Pat. No. 4,017,438, incorporated by reference herein); or (iii) a reaction product obtained by etherification between a polyepoxide compound and a hydroxy compound having a primary amino group converted into a ketimine form (see, for example, Japanese Patent Application Kokai (Laid-Open) No. 43013/1984, incorporated by reference herein). In certain embodiments, the polyepoxide compound used in the production of the amine-added epoxy resin has at least two epoxy groups in the molecule and preferably has a number-average molecular weight of generally at least about 200, for example from about 400 to about 4,000, or from about 800 to about 2,000. In a specific embodiment, the polyepoxide is a compound obtained by a reaction between a polyphenol compound and epichlorohydrin. In certain embodiments, this polyphenol compound is bis(4-hydroxyphenyl)-2,2-propane; 4,4-dihydroxybenzophenone; bis(4-hydroxyphenyl)-1,1-ethane; bis(4-hydroxyphenyl)-1,1-isobutane; bis(4-hydroxy-tert-butylphenyl)-2,2-propane; bis(2-hydroxynaphthyl)methane; 1,5-dihydroxynaphthalene; bis(2,4-hydroxyphenyl)methane; tetra(4-hydroxyphenyl)-1, 1,-2,2-ethane; 4,4-dihydroxydi-phenyl-sulfone; phenolic novolac, or cresylic novolac. In certain embodiments, the polyepoxide compound is partially reacted with a polyol, a polyether polyol, a polyester polyol, a polyamideamine, a polycarboxylic acid, a polyisocyanate compound, or the like. In certain embodiments, the polyepoxide compound is graft-polymerized with ε-caprolactone, an acrylic monomer, or the like.

In certain embodiments, an active hydrogen-containing ionic resin is a cationic acrylic resins, such as those described in U.S. Pat. Nos. 3,455,806 and 3,928,157, incorporated by reference herein in their entirety. In certain embodiments, the active hydrogen-containing ionic resin is a cationic polyester resins, for example one containing ionic groups and active hydrogen groups.

In certain embodiments, the active hydrogen-containing ionic resin is one having one or more quaternary ammonium salt groups, for example, those which are formed from reacting an organic polyepoxide with a tertiary amine salt, such as described in U.S. Pat. Nos. 3,962,165; 3,975,346; 4,001,101; and 4,101,486, which are incorporated herein by reference in their entirety. In certain embodiments, the active hydrogen-containing ionic resin is one having one or more ternary sulfonium salt groups and/or one or more quaternary phosphonium salt groups, such as those described in U.S. Pat. Nos. 3,793,278 and 3,984,922, respectively, each of which is incorporated herein by reference in its entirety.

In a particular embodiment, the active hydrogen-containing resin is a cationic resins having primary and/or secondary amine groups, for example those described in U.S. Pat. Nos. 3,663,389; 3,947,339 and 4,116,900, which are incorporated herein by reference in their entirety. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetramine and the excess polyamine vacuum stripped from the reaction mixture. Such products are described in U.S. Pat. Nos. 3,663,389 and 4,116,900, which are incorporated herein by reference in their entirety. All of the above are active hydrogen-containing resins in certain embodiments of the electrocoating composition.

In certain embodiments, the active hydrogen-containing resins are modified by chain-extending the polyepoxide to increase its molecular weight, such as described in U.S. Pat. No. 4,148,772 (in which the polyepoxide is chain-extended with a polyester polyol) and in U.S. Pat. No. 4,468,307 (in which the polyepoxide is chain-extended with a particular polyether polyol), each of which is incorporated by reference in its entirety. In certain embodiments, the chain extension methods described in Canadian Patent 1,179,443, incorporated by reference herein, can be used.

In certain embodiments, a polyepoxide is used in preparing the cationic resins. In certain embodiments, the polyepoxide is a polymer having an epoxy equivalency greater than 1, for example about 2 or more. In certain embodiments, the polyepoxide contains 1,2-epoxide groups and is difunctional with regard to epoxy. In a specific embodiment, the polyepoxide is a polyglycidyl ether of a cyclic polyol or a polyglycidyl ether of a polyphenol such as bisphenol A. In certain embodiments, the polyepoxide is an acrylic polymers having epoxy groups. These polymers can be formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156, which is incorporated by reference herein.

In certain embodiments, the cationic resin can be prepared by reacting a bisphenol A type epoxy resin with an epoxy equivalent weight of from about 200 to about 2000, for example from about 400 to about 1000, with an amine. In certain embodiments, this amine is ammonia, a primary amine, a secondary amine, or a tertiary amine. In embodiments where ammonia is used in the preparation of the cationic resin, the reaction of the epoxy resin with ammonia is conducted in the presence of large excess of free ammonia to suppress gelation of the resin. In this reaction a combination of primary, secondary and tertiary amine functional resin is formed. In embodiments where primary amines are used, depending on the ratio of amine to epoxy, secondary and tertiary amine functional resins are formed. In embodiments where secondary amines are used, tertiary amine functional resins are produced. If an excess of epoxy is used and if the reaction is conducted in the presence of water and neutralizing acid, quaternary ammonium group-containing resins may be formed.

In certain embodiments, the cationic resin is prepared by co-polymerization of a cationic monomer (e.g., dimethyl-amino-propyl-methacrylate, dimethyl-amino-ethyl-methacrylate, dimethyl-amino-propyl-acrylamide or t-butyl-amino-ethyl-acrylate) with an acrylic or methacrylic ester monomer, or with styrene, or with acrylonitrile. In other embodiments, the cationic resin is prepared by the reaction of amine-containing anhydride functional polymers with a mono epoxide compound, for example as shown in U.S. Pat. No. 3,984,382, incorporated by reference herein.

In certain embodiments, the capped polyisocyanate curing agent is an isocyanate where the isocyanato groups have been reacted with a compound so that the resultant capped isocyanate is stable to active hydrogens at room temperature but reactive with active hydrogens at elevated temperature, usually between about 90° and about 200° C.

In certain embodiments, the polyisocyanate of the capped polyisocyanate is an aliphatic or an aromatic polyisocyanates, or mixtures thereof. In certain embodiments, the capped polyisocyanate is an aliphatic polyisocyanates, for example, trimethylene, tetramethylene, tetramethylxylylene, pentamethylene, hexamethylene, 1,2-propylene, 1,2-burylens, 2,3-burylens, or 1,3-butylene diisocyanate. In certain embodiments, the polyisocyanate of the capped polyisocyanate is 1,3-cyclopentane, 1,4-cyclohexane, 1,2-cyclohexane, or isophorone diisocyanate. In certain embodiments, the polyisocyanate of the capped polyisocyanate is an aromatic polyisocyanates, for example m-phenylene, p-phenylene, 4,4-diphenyl, 1,5-naphthalene or 1,4-naphthalene diisocyanate. In certain embodiments, the polyisocyanate of the capped polyisocyanate is diphenylmethane-4,4-diisocyanate (MDI) or polymeric diphenylmethane-4,4-diisocyanate (crude MDI). In certain embodiments, the polyisocyanate of the capped polyisocyanate is a mixed aliphatic-aromatic compound, such as 2,4- or 2,6-tolylene diisocyanate, or mixtures thereof, 4,4-toluidine diisocyanate, or 1,4-xylylene diisocyanate. In certain embodiments, the polyisocyanate of the capped polyisocyanate is as dianisidine diisocyanate, 4,4-diphenylether diisocyanate, chlorodiphenylene diisocyanate. In certain embodiments, the polyisocyanate of the capped polyisocyanate is a triisocyanate, such as triphenylmethane-4,4,4-triisocyanate, 1,3,5-triisocyanatobenzene, or 2,4,6-triisocyanatotoluene. In certain embodiments, the polyisocyanate of the capped polyisocyanate is a tetraisocyanate, such as 4,4-dimethyldiphenylmethane-2,2,5,5-tetraisocyanate. In certain embodiments, the polyisocyanate of the capped polyisocyanate is a polymerized polyisocyanate, such as tolylene diisocyanate dimers or trimers, and the like.

In certain embodiments, the polyisocyanate of the capped polyisocyanate is toluene diisocyanate (TDI), diphenylmethane diisocyanate (MDI), 1,6-hexamethylene diisocyanate (HDI), phenyl isocyanate, 4,4'-dicyclohexylmethane diisocyanate, isophorone diisocyanate (IPDI), meta-tetramethylxylene diisocyanate (TMXDI), nonanetriisocyanate (TTI) or vinyl isocyanate. In certain embodiments, the polyisocyanate of the capped polyisocyanate is an isocyanurate, an allophanate, a biuret, or a polyurethane product derived from the above-mentioned isocyanates. In certain embodiments, the polyisocyanate of the capped polyisocyanate is an addition products of a monomeric isocyanate with a polyester or a polyether polyol having terminal isocyanate groups.

In certain embodiments, the polyisocyanate of the capped polyisocyanate is a prepolymer derived from a polyol, for example polyether polyol or polyester polyol, including polyols which are reacted with excess polyisocyanates to form isocyanate-terminated prepolymers. These may be simple polyols such as glycols, for example, ethylene glycol and propylene glycol, as well as other polyols such as glycerol, trimethylolpropane, hexanetriol, pentaerythritol, and the like, as well as ether-alcohols such as diethylene glycol, tripropylene glycol and the like and polyethers, that is, alkylene oxide condensates of the above. In certain embodiments, the alkylene oxides that may be condensed with these polyols to form polyethers are ethylene oxide, propylene oxide, butylene oxide, styrene oxide and the like. These are generally called hydroxy-terminated polyethers and can be linear or branched. In specific embodiments, the polyether is polyoxyethylene glycol having a molecular weight of approximately 1540, polyoxypropylene glycol having a molecular weight of approximately 1025, polyoxytetramethylene glycol, polyoxyhexamethylene glycol, polyoxynonamethylene glycol, polyoxydecamethylene glycol, polyoxydodecamethylene glycol, or a mixture thereof. In other embodiments, the polyether polyol is one derived from reacting a polyol such as ethylene glycol, diethylene glycol, triethylene glycol, 1,4-butylene glycol, 1,3-butylene glycol, 1,6-hexanediol, or mixtures thereof; glycerol, trtmethylolethane, trimethylolpropane, 1,2,6-hexanetriol, pentaerythritol, dipentaerythritol, tripentaerythritol, polypentaerythritol, sorbitol, methyl glucosides, sucrose, or the like; with an alkylene oxide, such as ethylene oxide, propylene oxide, mixtures thereof, or the like.

In certain embodiments, the molecular weight of the polyol ranges from about 62 to about 1,000,000, or from about 62 to about 100,000, or from about 62 to about 10,000. In certain embodiments, the polyol has a molecule weight from about 300 to about 2000, for example when used in solvent borne high solids coatings. In certain embodiments, the polyol has a the hydroxyl number from about 10 to about 1000. In certain embodiments, the polyol bears other functional groups, such as carboxyl, amino, urea, carbamate, amide and epoxy groups. In certain embodiment, the polyol is employed in a solvent free system, or as a solution in an organic solvent, or as a dispersion/emulsion in water. In specific embodiments, the polyol is a polyether polyol, a polyester polyol, an acrylic polyol, an alkyd resin, or a polyurethane polyol.

In certain embodiments, the polyether polyol is a reaction product of ethylene or propylene oxide or tetrahydrofuran with a diol or a polyol. In certain embodiments, the polyether polyol is derived from a natural product, such as cellulose and synthetic epoxy resins. In certain embodiments, the polyether polyol is a reaction product of a diol, a triol, or a polyol with a di- or polybasic acid. In certain embodiments, the alkyd resin is prepared in a similar process except that mono functional fatty acids may be included. In certain embodiments, the acrylic polyol is a reaction product of an ester of acrylic or methacrylic acid with an hydroxyl containing monomer, such as hydroxyethyl, hydroxypropyl or hydroxybutyl ester of acrylic or methacrylic acid. These acrylic polymers can also contain other vinyl monomers such as styrene or acrylonitrile vinyl chloride. In certain embodiments, the polyurethane polyol is the reaction product of a polyether or polyester polyol with a diisocyanates.

Such polyols may be prepared in bulk in the absence of a solvent or in the presence of a diluent or by emulsion polymerization in water. Alternatively, they may be prepared in bulk or in a solvent and then dispersed in water. For a description of the methods of preparing polyols see Organic Coatings Science Technology, vol. 1, Wiley-Interscience Co., 1992.

In certain embodiments, the capped polyisocyanate is capped with a removable blocking group. In various embodiments, the blocking group is a malonate, a triazole, an ε-caprolactam, a phenol, a ketoxime, a pyrazole, an alcohol, a glycol, a glycol ether, or a uretdione. In certain embodiments, de-blocking to the isocyanate is a displacement reaction, wherein the blocking group is displaced with another group.

In certain embodiments, the capping agent of the capped isocyanate is an alcohol, for example a glycol monoether or an amino alcohol. In certain embodiments, the capping agent is an aliphatic alcohols (e.g., methanol or 2-ethylhexyl alcohol), a cycloaliphatic alcohol (e.g., cyclohexanol), an aromatic alkyl alcohols (e.g., benzyl alcohol), a glycol monoether (e.g., a monoalkyl ether of ethylene glycol, such as the monobutyl ether of ethylene glycol), an amino alcohols (e.g., dimethylethanolamine.), an oximes (e.g., methyl ethyl ketoxime), a lactam (e.g., epsilon-caprolactam), an aliphatic amine (e.g., dibutylamine), or a beta-dicarbonyl compound (e.g., acetyl acetone).

In certain embodiments, the capped polyisocyanate is fully capped, that is, no free isocyanate groups remain. In other embodiments, the capped polyisocyanate is partially capped, for example, half-capped diisocyanate. In such embodiments, the partially capped isocyanate can then be reacted with a portion of the active hydrogen groups, i.e., hydroxyl groups, under conditions which will not uncap the capped isocyanate group. This reaction in effect fully caps the isocyanate making it a part of the resin molecule, providing a one-component system. In such embodiments, the reaction of the partially capped polyisocyanate and the active hydrogen functionality in the resin is conducted at low or moderate temperature, for example less than about 150° C., to preserve the capped isocyanate groups in order to avoid gelation and to retain latent crosslinking sites. Solvent, particularly a water-miscible one such as an ether, ester or ketone, may be used. In certain embodiments, whether partially capped or fully capped, the electrocoating composition comprises about 0.1 to about 1.0 capped isocyanate groups for each active hydrogen.

In certain embodiments, the capped polyisocyanate is formed by reacting a carbonate (such as ethylene or propylene carbonate) with a polyamine.

In certain embodiments, the electrocoating composition comprises active hydrogen-containing ionic resin in an amount from about 20 to about 90 percent, for example from about 30 to about 70 percent by weight based on the weight of resin solids present. In certain embodiments, the electrocoating composition comprises capped polyisocyanate in an amount from about 5 to about 75 percent, for example from about 20 to about 60 percent by weight based on the weight of resin solids present.

In certain embodiments, the electrocoating composition is an aqueous dispersions. The term "dispersion" refers to a two-phase transparent, translucent or opaque resinous system in which the resin is in the dispersed phase and the water is in the continuous phase. In certain embodiments, the average particle size of the resinous phase is less than 10 microns, for example less than about 5 microns, or less than about 0.5 microns. In certain embodiments, the concentration of the resinous phase in the aqueous medium is at least about 1 percent, for example from about 2 to about 60 percent by weight based on weight of the aqueous dispersion. In certain embodiments, the electrocoating composition is in the form of a resin concentrate, they having a resin solids content of about 25 to about 60 percent by weight based on the weight of the aqueous dispersion. In certain embodiments, the electrocoating composition comprises resin solids content of about 5 to about 25 percent by weight based on total weight of the electrocoating composition.

In certain embodiments, the aqueous electrocoating composition further comprises a coalescing solvent. In certain embodiments, the coalescing solvent is a hydrocarbon, an alcohol, an ester, an ether, or a ketone. In certain embodiments, the coalescing solvent is isopropanol, butanol, 2-ethylhexanol, isophorone, 4-methoxy-pentanone, ethylene or propylene glycol, or a monoethyl, monobutyl a monohexyl ethers of ethylene glycol. In certain embodiments, the coalescing solvent is present in an amount from about 0.01 to about 25 percent, for example from about 0.05 to about 5 percent by weight based on the weight of the electrocoating composition.

In certain embodiments, the aqueous electrocoating composition further comprises an alcohol or a polyol solubilized or dispersed in water in the presence of nonionic groups or a nonionic surfactant. In certain embodiments, the alcohol or polyol is incorporated in the bisphenol epoxy resin itself, for example, a bisphenol epoxy resin reacted with a methoxy-polyethylene glycol or a methoxy-polyethylene-ether-amine with a molecular weight of from about 500 to about 2000.

In certain embodiments, the aqueous electrocoating composition further comprises a nonionic surfactant. An epoxy or an acrylic or polyester resin may be dispersed in water. The nonionic groups can be a part of the resin structure or a part of an external surfactant. In a specific embodiment, the aqueous electrocoating composition further comprises a solid bisphenol A glycidyl resin with a molecular weight of from about 900 to about 4000.

In certain embodiments, the vehicle resin is neutralized to impart water solubility or dispersibility, for example when the resin is a cationic resin, by neutralizing the resin with a water-soluble organic acid, such as formic acid, acetic acid, lactic acid or the like to impart water solubility or dispersibility and, when the resin is an anionic resin, by neutralizing the resin with an alkali such as amine, alkali metal hydroxide or the like to impart water solubility or dispersibility.

In certain embodiments, the cationic resin is dispersed in water in the presence of a water soluble organic acid or inorganic acid. In certain embodiments, the water soluble organic acid is formic acid, acetic acid, glycolic acid, or lactic acid. In certain embodiments, the water soluble inorganic acid is sulfamic acid.

In certain embodiments, the electrocoating composition further comprises ordinary additives for coatings, such as coloring pigments (e.g., titanium white, carbon black, red iron oxide, chrome yellow, or the like); extender pigments (e.g., talc, calcium carbonate, mica, clay, silica, or the like); and/or rust-preventive pigments (e.g., a chrome pigment such as strontium chromate, a lead pigment such as basic lead silicate or lead chromate, or the like)

In certain embodiments, the electrocoating composition further comprises a pigment composition and/or various additives such as surfactants, wetting agents or additional catalysts. The pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In certain embodiments, the pigment-to-resin ratio is within the range of about 0.02:1 to about 1:1. In certain embodiments, the other additives described above are present in amounts of about 0.01 to about 3 percent by weight based on the total solids weight of resins present.

In certain embodiments, the electrocoating composition is prepared by blending and dispersing the capped polyisocyanate crosslinker, the active hydrogen-containing ionic resin, and the catalyst described herein, in water. If pigments are added they can be dispersed separately in the resin. If neutralization of the ionic resin with an acid is required, the acid can be added to the resin or to the water phase. In certain embodiments, high shear dispersers are used to emulsify or disperse the resin.

In certain embodiments, the electrocoating formulation comprises the capped polyisocyanate in an amount sufficient to facilitate crosslinking. In certain embodiments, the electrocoating composition comprises the catalyst described herein in an amount from about 0.01 to about 5 weight percent, for example from about 0.1 to about 1.0 weight percent, of metal based on the total resin solids in the formulation.

In certain embodiments, the electrocoating composition is used by contacting the coating composition with an electrically conductive anode and an electrically conductive cathode, where the surface to be coated is either the cathode or the anode, depending on whether the ionic active hydrogen-containing resin is anionic or cationic. Following contact with the coating composition, an adherent film is deposited on one electrode when a sufficient voltage is impressed between the electrodes. The conditions under which electrodeposition is carried out are, in general, similar to those used in electrodeposition of other types of coatings. In certain embodiments, the applied voltage is from about 1 volt to about 3000 volts, for example from about 50 to about 500 volts. In certain embodiments, the current density is between about 0.5 and about 5 amperes per square foot, tends to decrease during electrodeposition indicating the formation of an insulating film. The coating compositions of the present invention can be applied to a variety of electroconductive substrates especially metals such as steel, aluminum, copper, magnesium and conductive carbon coated materials.

Thus, in related embodiments, provided herein is a method of electrocoating a substrate comprising contacting the coating composition with an electrically conductive anode and an electrically conductive cathode, where the surface to be coated is either the cathode or the anode, depending on whether the ionic active hydrogen-containing resin is anionic or cationic, and applying a voltage between the electrodes. The components of the electrocoating composition, as well as the conditions of the method, are described in more detail hereinabove.

In certain embodiments, the electrocoating composition produces a cured film with a thickness from about 10 to about 40 μm. In certain embodiments, after the coating has been applied by electrodeposition, it is cured, for example by baking at elevated temperatures, for example from about 90° to about 260° C., for example for about 1 to about 40 minutes.

4.4 Corrosion Inhibiting Compositions and Uses Thereof

In certain embodiments, the catalysts described herein are used as corrosion inhibitors in coating compositions for metallic surfaces. Thus, provided herein are coating compositions for metallic surfaces comprising a catalyst compositions comprising a metal amidine complex and one or more second compounds, as described herein. In certain embodiments, a corrosion inhibiting coating composition is a coating material, for example an aqueous coating material. In certain embodiments, the corrosion inhibiting coating composition is a lacquer, a paint, or a varnish. In certain embodiments, the corrosion inhibiting coating composition comprises an organic film-forming binder.

In certain embodiments, the catalyst composition is present in the corrosion inhibiting composition in an amount from about 0.05 to about 10 wt. %, about 0.1 to about 10 wt. %, about 0.5 to about 10 wt. %, about 1 to about 10 wt. %, about 2 to about 8 wt. %, about 2 to about 6 wt. %, about 2 to about 4 wt. %, or about 4 to about 8 wt. %, based on the total weight of the coating composition.

In certain embodiments, the metal amidine complex and the second compound are of the catalyst composition are, respectively: $Zn(1\text{-methylimidazole})_2(\text{acetate})_2$ and DABCO; $Zn(1\text{-methylimidazole})_2(\text{acetate})_2$ and zinc acetylacetonate; $Zn(1\text{-methylimidazole})_2(\text{acetate})_2$ and dibutyltin dilaurate; $Zn(1\text{-methylimidazole})_2(\text{acetate})_2$ and zirconium acetylacetonate; $Zn(1\text{-Methylimidazole})_2(2\text{-Ethylhexanoate})_2$ and a bismuth carboxylate; $Zn(1,1,3,3\text{-Tetramethylguanidine})_2(2\text{-Ethylhexanoate})_2$ and a bismuth carboxylate; $Zn(1\text{-methylimidazole})_2(\text{acetate})_2$ and a bismuth carboxylate; $Zn(1\text{-methylimidazole})_2(\text{acetate})_2$ and lithium neodecanoate; $Zn(2\text{-Ethylhexanoate})_2(\text{acetate})_2$ and phenylmercuric acetate; $Zn(1\text{-methylimidazole})_2(\text{acetate})_2$ and dinonylnaphthalene disulfonate; $Zn(1\text{-methylimidazole})_2(\text{acetate})_2$ and 1,2-dimethylimidazole; or $Zn(1\text{-methylimidazole})_2(\text{acetate})_2$ and 2-methylimidazole.

In certain embodiments, the organic film-forming binder is an epoxy resin, a polyurethane resin, an amino resin, an acrylic resin, an acrylic copolymer resin, a polyvinyl resin, a phenolic resin, a styrene/butadiene copolymer resin, a vinyl/acrylic copolymer resin, a polyester resin, an alkyd resin, or a mixture of two or more of these resins, or an aqueous basic or acidic dispersion of one or more of these resins, or an aqueous emulsion of one or more of these resins.

In certain embodiments, the organic film-forming binder is an alkyd resin, an acrylic resin, a two-component epoxy resin, a polyurethane resin, a polyester resin (which may be saturated or unsaturated), a water-dilutable phenolic resin (a dispersion derived thereof), a water-dilutable urea resin, a resin based on one or more vinyl/acrylic copolymers, or a hybrid systems based on, for example, one or more epoxy acrylate. In certain embodiments, these organic film-forming binders are useful for aqueous coating compositions.

In particular embodiments, the alkyd resin is a water-dilutable alkyd resin system which can be employed in air-drying form or in the form of stoving systems, optionally in combination with water-dilutable melamine resins; the systems may also be oxidatively drying, air-drying or stoving systems which are optionally employed in combination with aqueous dispersions based on acrylic resins or copolymers thereof, with, for example vinyl acetates.

In certain embodiments, the organic film-forming binder is an acrylic resin, which is a pure acrylic resin, an epoxy acrylate hybrid system, an acrylic acid or acrylic ester copolymer, a combination with a vinyl resin, or a copolymer with a vinyl monomer such as vinyl acetate, styrene, or butadiene. In certain embodiments, these acrylic resins are useful for systems that can be air-drying systems or stoving systems.

In certain embodiments, the organic film-forming binder is a water-dilutable epoxy resins in combination with a polyamine crosslinker. In certain embodiments, where a liquid epoxy resins are used, the addition of organic solvents to aqueous systems can be omitted. In certain embodiments where solid resins or solid-resin dispersions are used, small amounts of solvent may be added in order to improve film formation.

In certain embodiments, the organic film-forming binder is an epoxy resin. In certain embodiments, the epoxy resin is one based on an aromatic polyol, for example one based on a bisphenol. In certain embodiments, the epoxy resin is employed in combination with a crosslinker, for example an amino- or hydroxy-functional compounds, an acid, an acid anhydride, or a Lewis acid. In certain embodiments, the crosslinker is a polyamine, a polyaminoamide, a polysulfide-based polymer, a polyphenol, boron fluoride or its complex compounds, a polycarboxylic acid, a 1,2-dicarboxylic anhydride, or a pyromellitic dianhydride.

In certain embodiments, the organic film-forming binder is a polyurethane resin. In certain embodiments, the polyurethane resin is derived from a polyether, a polyester, and/or a polybutadiene with terminal hydroxyl groups, on the one hand, and from an aliphatic or aromatic polyisocyanate on the other hand.

In certain embodiments, the organic film-forming binder is a polyvinyl resin. In certain embodiments, the polyvinyl resin is a polyvinylbutyral, a polyvinyl acetate, or a copolymer thereof.

In certain embodiments, the organic film-forming binder is a phenolic resin. In certain embodiments, the phenolic resin is a synthetic resin in the course of whose construction phenols are the principal component. In specific embodiments, the phonelic resin is a phenol-, cresol-, xylenol- or resorcinol-formaldehyde resin, an alkylphenolic resin, or a condensation product of one or more phenols with acetaldehyde, furfurol, acrolein or other aldehydes.

In certain embodiments, the corrosion inhibiting coating compositions further comprises one or more of the following: pigment, dye, filler, flow control agent, dispersant, thixotropic agent, adhesion promoter, antioxidant, light stabilizer, and curing catalyst. In certain embodiments, such optional additional ingredients include other known anticorrosion agents, for example anticorrosion pigments, such as phosphate- or borate-containing pigments or metal oxide pigments or other organic or inorganic corrosion inhibitors, for example salts of nitroisophthalic acid, phosphoric esters, technical-grade amines or substituted benzotriazoles.

In certain embodiments, the pigment is titanium dioxide, iron oxide, aluminum bronze, or phthalocyanine blue.

In certain embodiments, the filler is talc, alumina, aluminum silicate, barytes, mica, or silica. In certain embodiments, the corrosion inhibitors is applied to a support material, such as, for example, a pulverulent fillers or pigment.

In certain embodiments, the flow control agent is based on a modified bentonite. In certain embodiments, the thixotropic agent is based on a modified bentonite.

In certain embodiments, the adhesion promoter is based on a modified silane.

In certain embodiments, the corrosion inhibiting coating composition further comprises both a basic filler and a pigment. Such a combination may give rise to a synergistic effect on corrosion inhibition. In particular embodiments, the basic filler/pigment is calcium carbonate or magnesium carbonate, zinc oxide, zinc carbonate, zinc phosphate, magnesium oxide, alumina, aluminum phosphate, or mixtures thereof. In certain embodiments, the basic organic pigment is based on aminoanthraquinone.

In certain embodiments, the corrosion inhibiting coating composition is prepared by adding the corrosion inhibiting composition (i.e., the catalysts described herein) to the coating material during its preparation, for example during pigment dispersion by grinding, or by dissolving the corrosion inhibiting compound in a solvent and the stirring the solution into the coating composition. In certain embodiments, the solution of corrosion inhibiting compound, for example an aqueous solution of the corrosion inhibiting compound, is used for pretreating the metal surface, which can then be subsequently coated with a topcoat.

In certain embodiments, the corrosion inhibiting compound is used directly in the preparation of the organic film-forming binder by addition polymerization or condensation polymerization of monomers. In such embodiments, the corrosion inhibitors is mixed in solid form, or dissolved, with the monomers prior to the polymerization reaction.

In certain embodiments, the corrosion inhibiting coating composition is applied to a substrate customary techniques, for example by spraying, dipping, spreading or electrodeposition. In certain embodiments, a plurality of coats are applied. The corrosion inhibitors are added primarily to the base layer (primer), since they are active in particular at the metal-coating interface. However, they can also be added to the intermediate coat or topcoat, as well. Depending on whether the binder is a physically, chemically or oxidatively drying resin or a heat-curing or radiation-curing resin, the coating is cured at room temperature or by heating (stoving) or by irradiation.

In certain embodiments, the corrosion inhibiting coating composition is a primer for metallic substrates such as, for example, iron, steel, copper, zinc or aluminum, or alloys thereof.

In certain embodiments, the corrosion inhibiting compound imparts adhesion properties between the coating and the substrate (e.g., a metal), showing no adverse effects on the storage stability of the novel coating compositions, and exhibit good compatibility with the binder.

In certain embodiments is provided a process for protecting a corrodable metal substrate, comprising applying thereto a corrosion inhibiting coating composition comprising an organic film-forming binder and at least one catalyst described herein (as corrosion inhibitor), and subsequently drying and/or curing the coated metal substrate.

In certain embodiments is provided a process for preparing a corrosion-resistant surface on a corrodable metal substrate, comprising treating surface of the corrodible metal substrate with a corrosion inhibiting coating composition comprising an organic film-forming binder and at least one catalyst described herein (as corrosion inhibitor), and subsequently drying and/or curing the treated corrodible metal substrate.

4.5 Examples

Metal Amidine Complex Preparation

[Metal(Amidine)$_2$(Ligand)$_x$] of this invention: To a mixture of amidine (2.0 moles) and metal carboxylate, or acetylacetonate (1 mole) was added methanol to make a 50% solution. The mixture was held at 50° C. for 2 hours or until it became a clear solution. The solution was filtered and dried. The example catalysts of Metal(Amidine)$_2$(Ligand)$_x$ are listed in the TABLE below. x is the oxidation state of the metal.

| | Example Catalyst | Physical Form |
|---|---|---|
| 1 | Zn(DBN*)$_2$(acetate)$_2$ | white powder |
| 2 | Zn(DBN*)$_2$(formate)$_2$ | white powder |
| 3 | Zn(DBN*)$_2$(2-ethylhexanoate)$_2$ | clear liquid |
| 4 | Zn(DBU*)$_2$(acetate)$_2$ | white powder |
| 5 | Zn(DBU*)$_2$(formate)$_2$ | white powder |
| 6 | Zn(DBU*)$_2$(2-ethylhexanoate)$_2$ | clear liquid |
| 7 | Zn(1-methylimidazole)$_2$(acetate)$_2$ | white powder |
| 8 | Zn(1-methylimidazole)$_2$(formate)$_2$ | white powder |
| 9 | Zn(1-methylimidazole)$_2$(2-ethylhexanoate)$_2$ | clear liquid |
| 10 | Zn(1,2-dimethylimidazole)$_2$(acetate)$_2$ | white powder |
| 11 | Zn(1,2-dimethylimidazole)$_2$(formate)$_2$ | white powder |
| 12 | Zn(1,2-dimethylimidazole)$_2$(2-ethylhexanoate)$_2$ | clear liquid |
| 13 | Zn(1-butylimidazole)$_2$(acetate)$_2$ | white powder |
| 14 | Zn(1-butylimidazole)$_2$(formate)$_2$ | white powder |
| 15 | Zn(1-butylimidazole)$_2$(2-ethylhexanoate)$_2$ | clear liquid |
| 16 | Zn(imidazole)$_2$(acetate)$_2$ | white powder |
| 17 | Zn(imidazole)$_2$(formate)$_2$ | white powder |
| 18 | Zn(imidazole)$_2$(2-ethylhexanoate)$_2$ | clear liquid |
| 19 | Zn(tetramethylguanidine)$_2$(acetate)$_2$ | white powder |
| 20 | Zn(tetramethylguanidine)$_2$(formate)$_2$ | white powder |
| 21 | Zn(tetramethylguanidine)$_2$(2-ethylhexanoate)$_2$ | clear liquid |
| 22 | Zn(1,3-diphenylguanidine)$_2$(acetate)$_2$ | white powder |
| 23 | Zn(1,3-diphenylguanidine)$_2$(formate)$_2$ | white powder |
| 24 | Zn(1,3-diphenylguanidine)$_2$(2-ethylhexanoate)2 | clear liquid |
| 25 | Zn(4,4-dimethyl-2-imidazoline)$_2$(acetate)$_2$ | white powder |
| 26 | Zn(4,4-dimethyl-2-imidazoline)$_2$(formate)$_2$ | white powder |
| 27 | Zn(4,4-dimethyl-2-imidazoline)$_2$(2-ethylhexanoate)$_2$ | clear liquid |
| 28 | Zn(MACKAZOLINE T*)$_2$(acetate)$_2$ | brown liquid |
| 29 | Zn(MACKAZOLINE T*)$_2$(formate)$_2$ | brown liquid |
| 30 | Zn(MACKAZOLINE T*)$_2$(2-ethylhexanoate)2 | brown liquid |
| 31 | Zn(Lindax-1*)$_2$(acetate)$_2$ | brown liquid |
| 32 | Zn(Lindax-1*)$_2$(formate)$_2$ | brown liquid |
| 33 | Zn(Lindax-1*)$_2$(2-ethylhexanoate)$_2$ | brown liquid |
| 34 | Zn(1-methylimidazole)$_2$(acac)$_2$ | white powder |
| 35 | Bi(1-methylimidazole)$_2$(acetate)$_3$ | white powder |
| 36 | Ca(1-methylimidazole)$_2$(acetate)$_2$ | white powder |
| 37 | Cd(1-methylimidazole)$_2$(acetate)$_2$ | white powder |
| 38 | La(1-methylimidazole)$_2$(acetate)$_3$ | white powder |
| 39 | Zr(1-methylimidazole)$_2$(acetate)$_x$(hydroxide)$_y$, x + y = 4 | white powder |
| 40 | Sn(1-methylimidazole)$_2$(2-ethylhexanoate)$_2$ | brown liquid |
| 41 | Hf(1-methylimidazole)$_2$(acac)$_4$ | yellow liquid |

*DBN: 1,5-Diazabicyclo[4.3.0]non-5-ene
DBU: 1,8-Diazabicyclo[5.4.0]undec-7-ene Amidines, Zinc Acetate Anhydrous, and Zinc Acetylacetonate [Zn(acac)$_2$] supplied by Aldrich.
Zinc Formate Anhydrous and Zinc 2-Ethylhexanoate supplied by Alfa Aesar.
MACKAZOLINE T supplied by McIntyre Group is tall oil hydroxyethyl imidazoline.
Lindax-1 supplied by Lindau Chemicals Inc. is 1-(2-hydroxypropyl)imidazole Reference is made to Example 1-31 of U.S. Pat. No. 7,485,729, hereby specifically incorporated by reference herein, which sets forth various specific examples of coating preparations, analogous to those described herein without the second compound included in the catalyst composition.

The following examples are illustrative of the scope of the disclosure, but are non-limiting.

Examples 1-3

Coating Preparation: Cathodic electrocoat baths were prepared by mixing DI water and main vehicle emulsions listed in TABLE 1. Main vehicle emulsions were as prepared based on Examples I-A of U.S. Pat. No. 5,767,191 (S. R. Zawacky et. Al., PPG), respectively. Zn(DBU)2(Carboxylate)2, Bismuth Carboxylate, and a mixture of Zn(DBU)2(Carboxylate)2 and Bismuth Carboxylate were incorporated into the main vehicle prior to emulsification at a concentration of 1.5% catalyst based on total resin solids. Electrocoats were deposited on pretreated cold rolled steel panels at a dry film thickness of approximately 20 μm and baked at the peak metal temperatures (PMT) of 177° C. and 163° C. for 20 minutes.

Liquid coating compositions for Examples 1-3 (amounts in % by weight):

TABLE 1

| Examples | 1 | 2 | 3 |
|---|---|---|---|
| DI Water | 51.84 | 51.84 | 51.84 |
| Main Vehicle Emulsion with 1.5% of a Zn(DBU)$_2$(Carboxylate)$_2$ Based on Total Resin Solids (35.0% Solids) | 48.16 | 0 | 0 |
| Main Vehicle Emulsion with 1.5% a Bismuth Carboxylate Based on Total Resin Solids (35.0% Solids) | 0 | 48.16 | 0 |
| Main Vehicle Emulsion with 1.5% of a Mixture of 50% a Zn(DBU)$_2$(Carboxylate)$_2$ and 50% a Bismuth Carboxylate Based on Total Resin Solids (35.0% Solids) | 0 | 0 | 48.16 |

TABLE 2

| Examples | Bake Schedule | MEK Double Rubs |
|---|---|---|
| 1 | 177° C.(PMT) × 20' | 100 (slight mar) |
| 1 | 163° C.(PMT) × 20' | 100 (slight mar) |
| 2 | 177° C.(PMT) × 20' | 100 (slight mar) |
| 2 | 163° C.(PMT) × 20' | 100 (slight mar) |
| 3 | 177° C.(PMT) × 20' | 100 (no mar) |
| 3 | 163° C.(PMT) × 20' | 100 (no mar) |

Examples 1-3 demonstrate that a mixture of 50% of a Zn(DBU)$_2$(Carboxylate)$_2$ and 50% of a bismuth carboxylate based on weight is an effective catalyst for cathodic electrocoat and the synergetic effects of the mixture. Even at distinctly lower baking temperatures, completely crosslinked coatings were obtained with the liquid coating composition according to the disclosure. These results indicate that such a synergistic effect would be observed with any metal carboxylate as the second compound.

Examples 4-5

Coating Preparation: 2-component solventborne polyurethane clearcoats were by Part A of polyol component and Part B of isocyanate component listed in TABLE 3. A mixture of 50% of a Zn(1,1,3,3-Tetramethylguanidine)$_2$(Carboxylate)$_2$ and 50% zinc octoate based on weight was incorporated into Part A of polyol component prior to mix with Part B of isocyanate component. Films were casted on pretreated cold rolled steel panels using a #50 drawdown rod to yield a dry film thickness of approximately 50 μm. One set of panels was cured at 80° C. for 30 minutes and another set was allowed to cure for 7 days at room temperature (Air dried).

Liquid coating compositions for Examples 4-5 (amounts in % by weight):

TABLE 3

| | Examples | |
|---|---|---|
| | 4 | 5 |
| Part A: | | |
| Joncryl 500 (Polyol Component) | 60.26 | 60.26 |
| BYK 310 (Silicone Flow Agent; 20% in methyl amyl ketone) | 0.955 | 0.955 |
| Methyl Amyl ketone (Solvent) | 15.02 | 15.02 |
| A Zn(1,1,3,3-Tetramethylguanidine)$_2$ Carboxylate | 0.025 | 0 |
| A mixture of 50% a Zn(1,1,3,3-Tetramethylguanidine)$_2$(Carboxylate)$_2$ and 50% Zinc Octoate | 0 | 0.025 |

TABLE 3-continued

| | Examples | |
|---|---|---|
| | 4 | 5 |
| Part B: | | |
| Desmodur XP-2410 (Isocyanate Component) | 22.14 | 22.14 |
| Methyl Amyl ketone (Solvent) | 1.60 | 1.60 |
| Total | 100.00 | 100.00 |

TABLE 4

| | Examples | |
|---|---|---|
| | 4 | 5 |
| | Pendulum Hardness | Pendulum Hardness |
| Film: Baked at 80° C. × 30' | 8 | 28 |
| Post Cure: 1 day | 20 | 45 |
| Post Cure: 3 days | 60 | 73 |
| Post Cure: 7 days | 61 | 73 |
| Film: Air Dried | | |
| Post Cure: 1 day | 8 | 18 |
| Post Cure: 3 days | 47 | 57 |
| Post Cure: 7 days | 48 | 60 |

Examples 4-5 demonstrate that a mixture of 50% of a Zn(1,1,3,3-Tetramethylguanidine)$_2$(Carboxylate)$_2$ and 50% zinc octoate based on weight is an effective catalyst for 2-component solventborne polyurethane clearcoats and the synergistic effects of the mixture for both baked and air dried systems. Completely crosslinked coatings were obtained with the liquid coating composition according to the disclosure. These results would indicate that such a synergistic effect would be observed with any metal carboxylate as a second compound.

Examples 6-7

Coating Preparation: Desmophen 651 MPA polyester polyol and Trixene BI 7984 MEKO blocked HDI polyisocyanate were homogeneously mixed. The resin mixtures were catalyzed with metal catalysts listed in TABLE 5 at a concentration of 0.14% metal catalyst based on the total resin used. Films were cast on pretreated steel panels at a dry film thickness of approximately 25 μm and baked for 30 minutes at 135° C.

Liquid coating compositions for Examples 6-7 (amounts in % by weight):

TABLE 5

| Examples | 6 | 7 |
|---|---|---|
| Desmophen 651MPA (Polyester Polyol) | 36.59 | 36.59 |
| Trixene BI 7984 (Blocked Polyisocyanate) | 44.19 | 44.19 |
| BYK 310 (Silicone Flow Agent) | 0.15 | 0.15 |
| Methyl Isobutyl Ketone (Solvent) | 6.31 | 6.31 |
| PM Acetate (Solvent) | 6.31 | 6.31 |
| Xylene (Solvent) | 6.31 | 6.31 |
| A Zn(1,1,3,3-Tetramethylguanidine)$_2$(Carboxylate)$_2$ | 0.14 | 0 |
| A mixture of a 50% Zn(1,1,3,3-Tetramethylguanidine)$_2$(Carboxylate)$_2$ and 50% Zinc Octoate | 0 | 0.14 |
| Total | 100.00 | 100.00 |

TABLE 6

| Examples | Bake Schedule | Pendulum Hardness | MEK Double Rubs |
|---|---|---|---|
| 6 | 135° C. × 30' | 160 | 98 |
| 7 | 135° C. × 30' | 165 | 100+ |

Examples 6-7 demonstrate that a mixture of 50% a Zn(1,1,3,3-Tetramethylguanidine)$_2$(Carboxylate)$_2$ and 50% zinc octoate based on weight is an effective catalyst for MEKO blocked HDI polyisocyanate liquid coatings and the synergetic effects of the mixture. Even at distinctly lower baking temperatures, completely crosslinked coatings were obtained with the liquid coating composition according to the invention. These results would indicate that such a synergetic effect would be observed with any metal carboxylate as a second compound.

Examples 8-14

A clear millbase (Part A), containing the acrylic polyol is prepared using the following ingredients:

| Ingredients - Polyol Part A | Weight |
|---|---|
| Joncryl 500 - Acrylic Polyol | 66.96 |
| Xylene | 3.89 |
| EEP | 8.94 |
| MIBK | 6.61 |
| Premix next 4 Items | |
| MIBK | 6.40 |
| Butyl Acetate | 2.80 |
| Tinuvin 292 | 0.73 |
| Tinuvin 1130 | 1.47 |
| Byk 310 | 0.18 |
| MIBK | 1.0 |
| Total weight of clear base | 98.98 |

An isocyanate curing agent solution (Part B) is prepared using the following ingredients:

| Curing Agent solution IsocyanatePartB | Weight |
|---|---|
| Xylene | 6.89 |
| Butyl Acetate | 9.97 |
| EEP (Ethyl 3-Ethoxypropionate). | 2.01 |
| MIBK(Methyl Isobutyl Ketone) | 9.37 |
| Basonat HI 100 - HDI Trimer | 37.46 |
| Total weight of Part B | 65.70 |

The print resistance of various coatings was measured using the ASTM D 2091-96 test method. After the requisite cure (30'@ 600 C), a 1.5×1.25" piece of metal mesh is placed on the surface of the panel with 2000 grams weight on top of it for 20 seconds. The weight is then removed and the surface of the coating was examined for mesh profile, which is a measure of sufficient cure. If no mesh profile is seen on the cured film then the coating is considered to be sufficiently cured.

Various coating compositions containing a zinc amidine carboxylate catalyst either alone or in combination with a carboxylic acid second compound were prepared using the formulations described below, and print resistance was measured using the protocol described above.

| | Examples | | | | | | |
|---|---|---|---|---|---|---|---|
| | 8 | 9 | 10 | 11 | 12 | 13 | 14 |
| Joncryl 500 Clear Millbase | 98.98 | 98.98 | 98.98 | 98.98 | 98.98 | 98.98 | 98.98 |
| Catalyst Systems Evaluated | | | | | | | |
| Zn(1-MI)$_2$(2-ethylhexanoate)$_2$ | 0.13 | 0.13 | 0.13 | 0.13 | 0.13 | 0.13 | 0.13 |
| Cyclohexane Dicarboxylic | 0.00 | 1.14 | 0.00 | 0.00 | 0.00 | 0.00 | 0.00 |
| Neodecanoic Acid | 0.00 | 0.00 | 2.27 | 0.00 | 0.00 | 0.00 | 0.00 |
| NEO 913 Acid(a blend of branchedC9 and C13 acids | 0.00 | 0.00 | 0.00 | 2.55 | 0.00 | 0.00 | 0.00 |
| Neo Heptanoic Acid | 0.00 | 0.00 | 0.00 | 0.00 | 1.72 | 0.00 | 0.00 |
| Neo Pentanoic Acid | 0.00 | 0.00 | 0.00 | 0.00 | 0.00 | 1.35 | 0.00 |
| Butyl Octanoic acid | 0.00 | 0.00 | 0.00 | 0.00 | 0.00 | 0.00 | 2.64 |
| Total Weight of Part A | 99.11 | 100.25 | 101.38 | 101.66 | 100.83 | 100.46 | 101.75 |
| Weight of Activator - Part B | 65.70 | 65.70 | 65.70 | 65.70 | 65.70 | 65.70 | 65.70 |
| NCO:OH | 1.5:1.0 | 1.5:1.0 | 1.5:1.0 | 1.5:1.0 | 1.5:1.0 | 1.5:1.0 | 1.47:1.0 |
| Cure schedule 30 Mins @ 60° C. | | | | | | | |
| ADFT - Mils | 1.55 | 1.20 | 1.35 | 1.35 | 1.40 | 1.32 | 1.45 |
| Print Test - Time out of oven | | | | | | | |
| 0 Hours | Print | No Print | No Print | No Print | No Print | No Print | No Print |
| 0.5 Hours | Print | | | | | | |
| 1.0 Hours | Print | | | | | | |
| 1.5 Hours | Print | | | | | | |
| 2.0 Hours | Print | | | | | | |
| 2.5 Hours | Print | | | | | | |
| 3.0 Hours | Print | | | | | | |
| 4.0 Hours | Print | | | | | | |
| 5.0 Hours | Print | | | | | | |

The above results show that coating compositions comprising carboxylic acids as a second compound in combination with a zinc amidine carboxylate catalyst result in a faster cure compared a corresponding coating composition without a carboxylic acid as a second compound.

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

Illustrative embodiments:

1. A composition comprising a metal amidine complex and a second compound, wherein the second compound is a metal carboxylate or a carboxylic acid.

2. The composition of item 1, wherein the metal amidine complex is of the chemical formula M(amidine)$_w$(carboxylate)$_2$, wherein w is an integer from 1 to 4.

3. The composition of item 1 or 2, wherein the metal of the metal amidine complex is zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium.

4. The composition of item 1 or 3, wherein the amidine of the metal amidine complex is an amidine of formulae I-VIII as set forth and defined in paragraphs [0030]-[0035].

5. The composition of any of items 1-4, wherein the carboxylate is of the following formula:

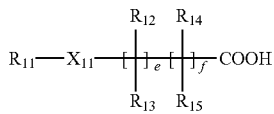

as set forth and defined in paragraph [0037].

6. The composition of any one of items 1-5, wherein the second compound is a compound set forth in the tables in paragraph [0043].

7. The composition of any one of items 1-6, wherein the second compound is a zinc carboxylate.

8. The composition of any one of items 1-6, wherein the second compound is a bismuth carboxylate.

9. The composition of any one of items 1-6, wherein the second compound is a carboxylic acid.

10. A coating composition comprising:
    (a) a binder having uretdione groups and optionally isocyanate groups; and
    (b) the composition of any one of items 1-9.

11. The coating composition of item 10, further comprising:
    (c) an acid scavenger.

12. A coating composition comprising:
    (a) an epoxy compound;
    (b) a carboxyl, an anhydride, a dicyandiamide (DICY), or a phenolic compound; and
    (c) the composition of any one of items 1-9.

13. A coating composition comprising:
    (a) a bisphenol A epoxy/amino resin with an equivalent weight of from about 200 to about 2000;
    (b) an aromatic or aliphatic isocyanate with a removable blocking group; and
    (c) the composition of any one of items 1-9.

14. A coating composition comprising:
    (a) an organic film-forming binder; and
    (b) the composition of any one of items 1-9.

15. An electrocoating composition comprising:
    (a) a cationic resin;
    (b) a capped polyisocyanate; and
    (c) the composition of any one of items 1-9.

16. The electrocoating composition of item 15, wherein the cationic resin is an epoxy-amine reaction product of a bisphenol A epoxy resin with an epoxy equivalent weight of between 200 and 2000 and a primary amine, a secondary amine, or a tertiary amine.

17. A polyurethane coating composition comprising:
    (a) a polyol;
    (b) a polyisocyanate; and
    (c) the composition of any one of items 1-9.

18. A coating composition comprising:
    (a) a binder;
    (b) a hardener; and
    (c) the composition of any one of items 1-9.

19. The coating composition of item 18, wherein the hardener is an aromatic or aliphatic isocyanate and wherein the isocyanate contains a removable blocking group.

We claim:

1. A catalyst composition comprising a metal amidine complex and a second compound, wherein the second compound is a metal carboxylate or a carboxylic acid, wherein the metal of the metal amidine complex and the metal of the metal carboxylate are not identical.

2. The catalyst composition of claim 1, wherein the metal amidine complex is of the chemical formula metal(amidine)$_w$(carboxylate)$_2$, wherein w is an integer from 1 to 4.

3. The catalyst composition of claim 1, wherein the metal of the metal amidine complex and the metal of the metal carboxylate are independently zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium.

4. The catalyst composition of claim 1, wherein the amidine of the metal amidine complex is an amidine of one of formulae I-VIII:

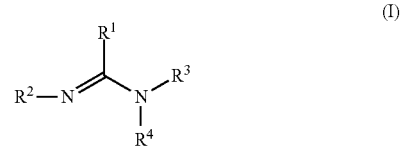

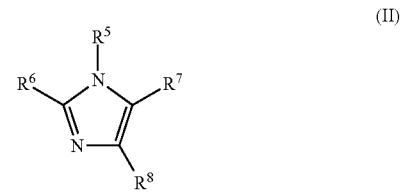

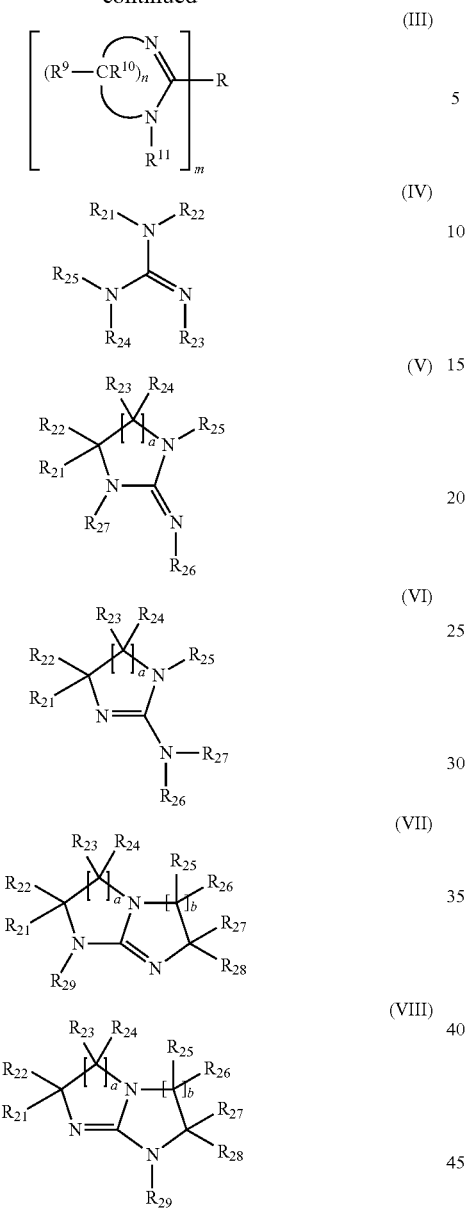

wherein

R[1] is hydrogen, $C_1$-$C_{36}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl, an amine group which is optionally substituted, or a hydroxyl group which is optionally etherified with a hydrocarbyl group having up to 8 carbon atoms;

R[2] and R[3] are each independently hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, or $C_7$-$C_9$ phenylalkyl which is unsubstituted or substituted on the phenyl ring by $C_1$-$C_4$ alkyl, or R[2] and R[3] are joined to one another by an N═C—N linkage to form a heterocyclic ring with one or more hetero atoms or a fused bicyclic ring with one or more heteroatoms;

R[4] is hydrogen, $C_1$-$C_{36}$ alkyl, $C_1$-$C_{36}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl, or a hydroxyl group which can be optionally etherified with a hydrocarbyl group having up to 8 carbon atoms;

R[5], R[6], R[7], and R[8] are independently hydrogen, alkyl, substituted alkyl, hydroxyalkyl, aryl, aralkyl, cycloalkyl, heterocyclyl, ether, thioether, halogen, —N(R)$_2$, polyethylene polyamine, nitro, keto, ester, or carbonamide, optionally alkyl substituted with alkyl, substituted alkyl, hydroxyalkyl, aryl, aralkyl, cycloalkyl, heterocyclyl, ether, thioether, halogen, —N(R)$_2$, polyethylene polyamine, nitro, keto, or ester;

R[9], R[10], and R[11] are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms (wherein the aryl group of the aralkyl is further substituted by alkyl of 1 to 36 carbon atoms, ether, thioether, halogen, —N(R)$_2$, polyethylene polyamines, nitro groups, keto groups, ester groups, or carbonamide groups) (wherein the alkyl group of the aralkyl is optionally substituted with alkyl, substituted alkyl, hydroxyalkyl, aryl, aralkyl, cycloalkyl, heterocyclics, ether, thioether, halogen, —N(R)$_2$, polyethylene polyamines, nitro groups, keto groups or ester groups), wherein the R of —N(R)$_2$ is alkyl, alkylene, aryl, aralkyl, cycloalkyl or heterocyclic radical, optionally substituted with halogen, nitro, alkyl, alkoxy or amino, and, when m =1, R is hydrogen or a plurality of radicals optionally joined by hetero atoms O, N or S;

m is 1 or 2;

n is 2 or 3;

R$_{21}$-R$_{29}$ are independently hydrogen, alkyl, cycloalkyl, aryl, aromatic, ogranometallic, a polymeric structure, or together can form a cycloalkyl, aryl, or an aromatic structure;

a is 1, 2, or 3; and b is 1, 2, or 3.

5. The catalyst composition of claim 1, wherein the carboxylate is a carboxylate of a carboxylic acid of the following formula:

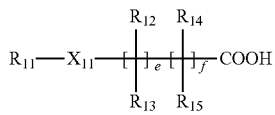

wherein

R$_{11}$ is hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl;

—$COR_{16}$, a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulae:

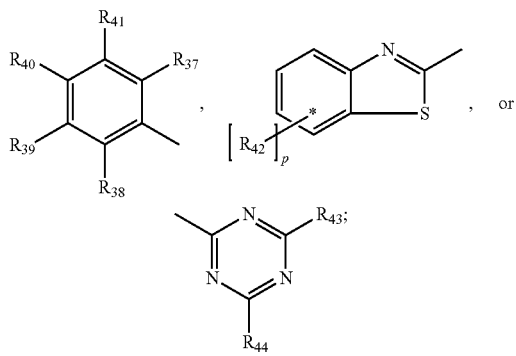

$R_{12}$, $R_{13}$, $R_{14}$ and $R_{15}$ are independently hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —$COR_6$, with the proviso that, if one of the radicals $R_{12}$, $R_{13}$, $R_{14}$ and $R_{15}$ is hydroxyl, the other radical attached to the same carbon atom is other than hydroxyl; or else $R_{12}$ and $R_{13}$ or $R_{14}$ and $R_{15}$, together with the carbon atom to which they are attached, form an unsubstituted or $C_1$-$C_4$ alkyl-substituted $C_5$-$C_{12}$ cycloalkylidene ring;

$R_{16}$ is hydroxyl, $C_1$-$C_{18}$ alkoxy, $C_2$-$C_{18}$ alkoxy which is interrupted by oxygen or sulfur,

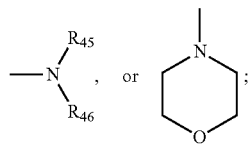

$R_{37}$, $R_{38}$, $R_{39}$, $R_{40}$, and $R_{41}$ are independently hydrogen, hydroxyl, halogen, nitro, cyano, $CF_3$, —$COR_6$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or $R_{38}$ and $R_{39}$, $R_{39}$ and $R_{40}$, $R_{40}$ and $R_{41}$, or $R_{37}$ and $R_{41}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R_{37}$, $R_{38}$, $R_{39}$, $R_{40}$ and $R_{41}$ is hydrogen;

$R_{42}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxgyen or sulfur; $C_1$-$C_{18}$ alkylthio; or $C_2$-$C_{24}$ alkenyl;

$R_{43}$ and $R_{44}$ are independently hydrogen, $C_1$-$C_{25}$ alkyl, $C_1$-$C_{18}$ alkoxy or —Y—$(CH_2)_s COR_6$;

$R_{45}$ and $R_{46}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl; $X_{11}$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if m and n are 0, $X_{11}$ is other than oxygen and sulfur;

Y is oxygen or

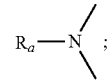

$R_a$ is hydrogen or $C_1$-$C_8$ alkyl;

e and f are independently integers from 0 to 10;

p is an integer from 0 to 4; and s is an integer from 1 to 8.

6. The catalyst composition of claim 2, wherein the metal of the metal amidine complex and the metal of the metal carboxylate are independently zinc or bismuth.

7. The catalyst composition of claim 3, wherein the amidine of the metal amidine complex is an amidine of formula II or IV.

8. The catalyst composition of claim 7, wherein the amidine is 1,1,3,3-tetramethyl guanidine or 1-methylimidazole.

9. The catalyst composition of claim 1, wherein the carboxylate is octoate, neodecanoate, naphthenate, stearate, or oxalate.

10. The catalyst composition of claim 1, wherein the second compound is a zinc carboxylate.

11. The catalyst composition of claim 1, wherein the second compound is a bismuth carboxylate.

12. The catalyst composition of claim 1, wherein the second compound is a carboxylic acid.

13. The catalyst composition of claim 1, wherein the metal amidine complex is of the chemical formula metal(amidine)$_2$(carboxylate)$_x$, wherein x is the oxidation state of the metal.

14. A catalyst composition comprising a metal amidine complex and a second compound, wherein the metal amidine complex comprises a carboxylate and wherein the second compound is a metal carboxylate or a carboxylic acid, wherein the carboxylate of the metal amidine complex and the carboxylate of the metal carboxylate are not identical.

15. The catalyst composition of claim 14, wherein the metal amidine complex is of the chemical formula M(amidine)$_w$(carboxylate)$_2$, wherein w is an integer from 1 to 4.

16. The catalyst composition of claim 14, wherein the metal of the metal amidine complex and the metal of the metal carboxylate are independently zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium.

17. The catalyst composition of claim 14, wherein the amidine of the metal amidine complex is an amidine of one of formulae I-VIII:

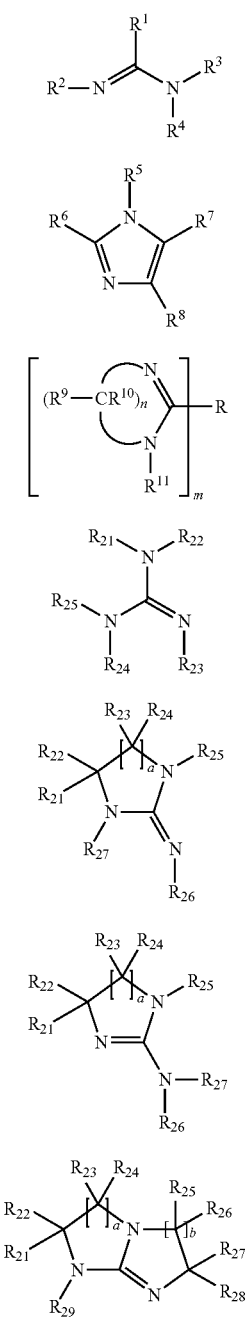

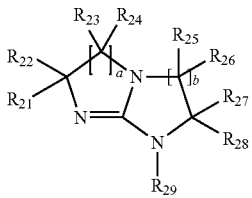

wherein
R$^1$ is hydrogen, C$_1$-C$_{36}$ alkyl, C$_2$-C$_{25}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, C$_7$-C$_9$ phenylalkyl which is unsubstituted or substituted on the phenyl ring by C$_1$-C$_4$ alkyl, an amine group which is optionally substituted, or a hydroxyl group which is optionally etherified with a hydrocarbyl group having up to 8 carbon atoms;
R$^2$ and R$^3$ are each independently hydrogen, C$_1$-C$_{25}$ alkyl, C$_2$-C$_{25}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, or C$_7$-C$_9$ phenylalkyl which is unsubstituted or substituted on the phenyl ring by C$_1$-C$_4$ alkyl, or R$^2$ and R$^3$ are joined to one another by an N=C—N linkage to form a heterocyclic ring with one or more hetero atoms or a fused bicyclic ring with one or more heteroatoms;
R$^4$ is hydrogen, C$_1$-C$_{36}$ alkyl, C$_1$-C$_{36}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, C$_7$-C$_9$ phenylalkyl which is unsubstituted or substituted on the phenyl ring by C$_1$-C$_4$ alkyl, or a hydroxyl group which can be optionally etherified with a hydrocarbyl group having up to 8 carbon atoms;
R$^5$, R$^6$, R$^7$, and R$^8$ are independently hydrogen, alkyl, substituted alkyl, hydroxyalkyl, aryl, aralkyl, cycloalkyl, heterocyclyl, ether, thioether, halogen, —N(R)$_2$, polyethylene polyamine, nitro, keto, ester, or carbonamide, optionally alkyl substituted with alkyl, substituted alkyl, hydroxyalkyl, aryl, aralkyl, cycloalkyl, heterocyclyl, ether, thioether, halogen, —N(R)$_2$, polyethylene polyamine, nitro, keto, or ester;
R$^9$, R$^{10}$, and R$^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms (wherein the aryl group of the aralkyl is further substituted by alkyl of 1 to 36 carbon atoms, ether, thioether, halogen, —N(R)$_2$, polyethylene polyamines, nitro groups, keto groups, ester groups, or carbonamide groups) (wherein the alkyl group of the aralkyl is optionally substituted with alkyl, substituted alkyl, hydroxyalkyl, aryl, aralkyl, cycloalkyl, heterocyclics, ether, thioether, halogen, —N(R)$_2$, polyethylene polyamines, nitro groups, keto groups or ester groups), wherein the R of —N(R)$_2$ is alkyl, alkylene, aryl, aralkyl, cycloalkyl or heterocyclic radical, optionally substituted with halogen, nitro, alkyl, alkoxy or amino, and, when m =1, R is hydrogen or a plurality of radicals optionally joined by hetero atoms O, N or S;

m is 1 or 2;

n is 2 or 3;

$R_{21}$-$R_{29}$ are independently hydrogen, alkyl, cycloalkyl, aryl, aromatic, ogranometallic, a polymeric structure, or together can form a cycloalkyl, aryl, or an aromatic structure;

a is 1, 2, or 3; and b is 1, 2, or 3.

18. The catalyst composition of claim 14, wherein the carboxylate is a carboxylate of a carboxylic acid of the following formula:

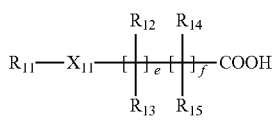

wherein $R_{11}$ is hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl; —$COR_{16}$, a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulae:

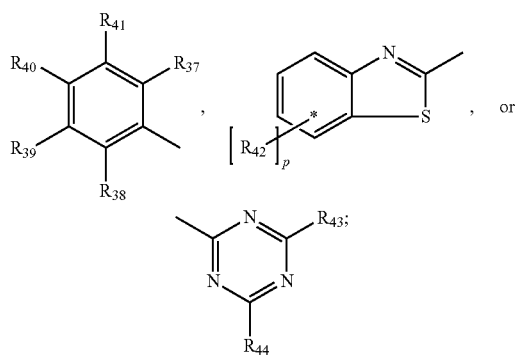

$R_{12}$, $R_{13}$, $R_{14}$ and $R_{15}$ are independently hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —$COR_6$, with the proviso that, if one of the radicals $R_{12}$, $R_{13}$, $R_{14}$ and $R_{15}$ is hydroxyl, the other radical attached to the same carbon atom is other than hydroxyl; or else $R_{12}$ and $R_{13}$ or $R_{14}$ and $R_{15}$, together with the carbon atom to which they are attached, form an unsubstituted or $C_1$-$C_4$ alkyl-substituted $C_5$-$C_{12}$ cycloalkylidene ring;

$R_{16}$ is hydroxyl, $C_1$-$C_{18}$ alkoxy, $C_2$-$C_{18}$ alkoxy which is interrupted by oxygen or sulfur,

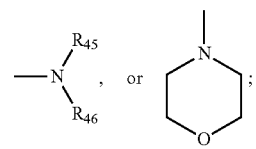

$R_{37}$, $R_{38}$, $R_{39}$, $R_{40}$, and $R_{41}$ are independently hydrogen, hydroxyl, halogen, nitro, cyano, $CF_3$, —$COR_6$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or $R_{38}$ and $R_{39}$, $R_{39}$ and $R_{40}$, $R_{40}$ and $R_{41}$ or $R_{37}$ and $R_{41}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R_{37}$, $R_{38}$, $R_{39}$, $R_{40}$, and $R_{41}$ is hydrogen;

$R_{42}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxgyen or sulfur; $C_1$-$C_{18}$ alkylthio; or $C_2$-$C_{24}$ alkenyl;

$R_{43}$ and $R_{44}$ are independently hydrogen, $C_1$-$C_{25}$ alkyl, $C_1$-$C_{18}$ alkoxy or —Y—$(CH_2)_s COR_6$;

$R_{45}$ and $R_{46}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl; $X_{11}$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if m and n are 0, $X_{11}$ is other than oxygen and sulfur;

Y is oxygen or

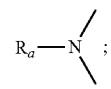

$R_a$ is hydrogen or $C_1$-$C_8$ alkyl;

e and f are independently integers from 0 to 10;

p is an integer from 0 to 4; and s is an integer from 1 to 8.

19. The catalyst composition of claim 16, wherein the metal of the metal amidine complex and the metal of the metal carboxylate are independently zinc or bismuth.

20. The catalyst composition of claim 17, wherein the amidine of the metal amidine complex is an amidine of formula I or IV.

21. The catalyst composition of claim 14, wherein the amidine is 1,1,3,3-tetramethyl guanidine or 1-methylimidazole.

22. The catalyst composition of claim 14, wherein the carboxylate is octoate, neodecanoate, naphthenate, stearate, or oxalate.

23. The catalyst composition of claim 14, wherein the second compound is a zinc carboxylate.

24. The catalyst composition of claim 14, wherein the second compound is a bismuth carboxylate.

25. The catalyst composition of claim 14, wherein the second compound is a carboxylic acid.

26. The catalyst composition of claim 14, wherein the metal amidine complex is of the chemical formula metal (amidine)$_2$(carboxylate)$_x$, wherein x is the oxidation state of the metal.

27. A catalyst composition comprising a metal amidine complex and a second compound, wherein the second compound is a metal carboxylate or a carboxylic acid, wherein the composition is substantially free of free amidine and wherein the metal is not tin.

28. The catalyst composition of claim 27, wherein the metal amidine complex is of the chemical formula M(amidine)$_w$(carboxylate)$_2$, wherein w is an integer from 1 to 4.

29. The catalyst composition of claim 27, wherein the metal of the metal amidine complex and the metal of the metal carboxylate are independently zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium.

30. The catalyst composition of claim 27, wherein the amidine of the metal amidine complex is an amidine of one of formulae I-VIII:

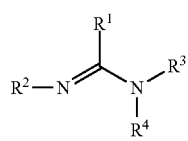
(I)

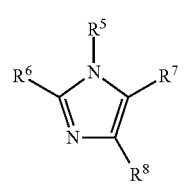
(II)

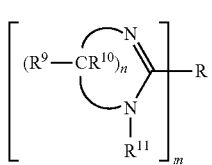
(III)

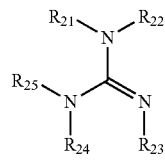
(IV)

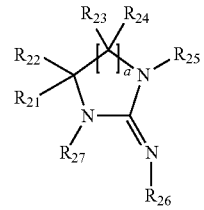
(V)

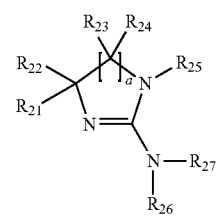
(VI)

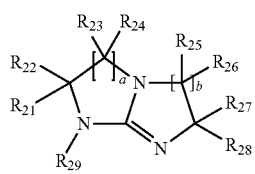
(VII)

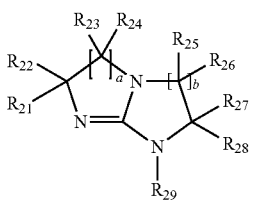
(VIII)

wherein
R$^1$ is hydrogen, C$_1$-C$_{36}$ alkyl, C$_2$-C$_{25}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, C$_7$-C$_9$ phenylalkyl which is unsubstituted or substituted on the phenyl ring by C$_1$-C$_4$ alkyl, an amine group which is optionally substituted, or a hydroxyl group which is optionally etherified with a hydrocarbyl group having up to 8 carbon atoms;

R$^2$ and R$^3$ are each independently hydrogen, C$_1$-C$_{25}$ alkyl, C$_2$-C$_{25}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, or C$_7$-C$_9$ phenylalkyl which is unsubstituted or substituted on the phenyl ring by C$_1$-C$_4$ alkyl, or R$^2$ and R$^3$ are joined to one another by an N=C—N linkage to form a heterocyclic ring with one or more hetero atoms or a fused bicyclic ring with one or more heteroatoms;

R$^4$ is hydrogen, C$_1$-C$_{36}$ alkyl, C$_1$-C$_{36}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/ or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl, or a hydroxyl group which can be optionally etherified with a hydrocarbyl group having up to 8 carbon atoms;

$R^5$, $R^6$, $R^7$, and $R^8$ are independently hydrogen, alkyl, substituted alkyl, hydroxyalkyl, aryl, aralkyl, cycloalkyl, heterocyclyl, ether, thioether, halogen, —N(R)$_2$, polyethylene polyamine, nitro, keto, ester, or carbonamide, optionally alkyl substituted with alkyl, substituted alkyl, hydroxyalkyl, aryl, aralkyl, cycloalkyl, heterocyclyl, ether, thioether, halogen, —N(R)$_2$, polyethylene polyamine, nitro, keto, or ester;

$R^9$, $R^{10}$, and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms (wherein the aryl group of the aralkyl is further substituted by alkyl of 1 to 36 carbon atoms, ether, thioether, halogen, —N(R)$_2$, polyethylene polyamines, nitro groups, keto groups, ester groups, or carbonamide groups) (wherein the alkyl group of the aralkyl is optionally substituted with alkyl, substituted alkyl, hydroxyalkyl, aryl, aralkyl, cycloalkyl, heterocyclics, ether, thioether, halogen, —N(R)$_2$, polyethylene polyamines, nitro groups, keto groups or ester groups), wherein the R of —N(R)$_2$ is alkyl, alkylene, aryl, aralkyl, cycloalkyl or heterocyclic radical, optionally substituted with halogen, nitro, alkyl, alkoxy or amino, and, when m =1, R is hydrogen or a plurality of radicals optionally joined by hetero atoms O, N or S;

m is 1 or 2;

n is 2 or 3;

$R_{21}$-$R_{29}$ are independently hydrogen, alkyl, cycloalkyl, aryl, aromatic, ogranometallic, a polymeric structure, or together can form a cycloalkyl, aryl, or an aromatic structure;

a is 1, 2, or 3; and b is 1, 2, or 3.

31. The catalyst composition of claim 27, wherein the carboxylate is a carboxylate of a carboxylic acid of the following formula:

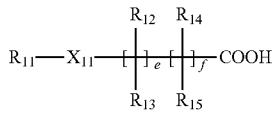

wherein $R_{11}$ is hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl; —COR$_{16}$, a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulae:

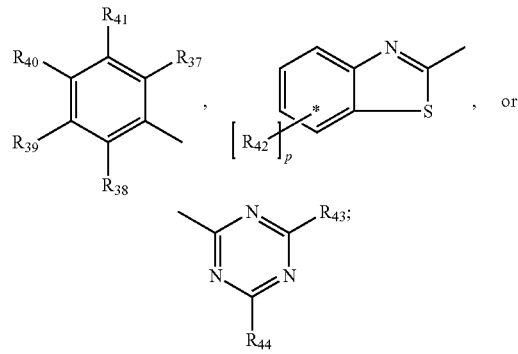

$R_{12}$, $R_{13}$, $R_{14}$, and $R_{15}$ are independently hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —COR$_6$, with the proviso that, if one of the radicals $R_{12}$, $R_{13}$, $R_{14}$, and $R_{15}$ is hydroxyl, the other radical attached to the same carbon atom is other than hydroxyl; or else $R_{12}$ and $R_{13}$ or $R_{14}$ and $R_{15}$, together with the carbon atom to which they are attached, form an unsubstituted or $C_1$-$C_4$ alkyl-substituted $C_5$-$C_{12}$ cycloalkylidene ring;

$R_{16}$ is hydroxyl, $C_1$-$C_{18}$ alkoxy, $C_2$-$C_{18}$ alkoxy which is interrupted by oxygen or sulfur,

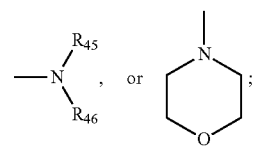

$R_{37}$, $R_{38}$, $R_{39}$, $R_{40}$, and $R_{41}$ are independently hydrogen, hydroxyl, halogen, nitro, cyano, CF$_3$, —COR$_6$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or $R_{38}$ and $R_{39}$, $R_{39}$ and $R_{40}$, $R_{40}$ and $R_{41}$, or $R_{37}$ and $R_{41}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R_{37}$, $R_{38}$, $R_{39}$, $R_{40}$, and $R_{41}$ is hydrogen;

$R_{42}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxgyen or sulfur; $C_1$-$C_{18}$ alkylthio; or $C_2$-$C_{24}$ alkenyl;

$R_{43}$ and $R_{44}$ are independently hydrogen, $C_1$-$C_{25}$ alkyl, $C_1$-$C_{18}$ alkoxy or —Y—$(CH_2)_s$$COR_6$;

$R_{45}$ and $R_{46}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl; $X_{11}$ is a direct bond, oxygen, sulfur, $C(O)$, $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if m and n are 0, $X_{11}$ is other than oxygen and sulfur;

Y is oxygen or

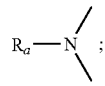

$R_a$ is hydrogen or $C_1$-$C_8$ alkyl;
e and f are independently integers from 0 to 10;
p is an integer from 0 to 4; and
s is an integer from 1 to 8.

32. The catalyst composition of claim 29, wherein the metal of the metal amidine complex and the metal of the metal carboxylate are independently zinc or bismuth.

33. The catalyst composition of claim 30, wherein the amidine of the metal amidine complex is an amidine of formula I or IV.

34. The catalyst composition of claim 33, wherein the amidine is 1,1,3,3-tetramethyl guanidine or 1-methylimidazole.

35. The catalyst composition of claim 27, wherein the carboxylate is octoate, neodecanoate, naphthenate, stearate, or oxalate.

36. The catalyst composition of claim 27, wherein the second compound is a zinc carboxylate.

37. The catalyst composition of claim 27, wherein the second compound is a bismuth carboxylate.

38. The catalyst composition of claim 27, wherein the second compound is a carboxylic acid.

39. The catalyst composition of claim 27, wherein the metal amidine complex is of the chemical formula metal $(amidine)_2(carboxylate)_x$, wherein x is the oxidation state of the metal.

40. A coating composition comprising a catalyst composition of claim 27.

41. The coating composition of claim 40, further comprising a binder having uretdione groups and optionally isocyanate groups.

42. The coating composition of claim 40, further comprising an acid scavenger.

43. The coating composition of claim 42, further comprising (a) an epoxy compound; and (b) a carboxyl, an anhydride, a dicyandiamide (DICY), or a phenolic compound.

44. The coating composition of claim 40, further comprising (a) a bisphenol A epoxy/amino resin with an equivalent weight of from about 200 to about 2000; and (b) an aromatic or aliphatic isocyanate with a removable blocking group.

45. The coating composition of claim 40, further comprising an organic film-forming binder.

46. The coating composition of claim 40, further comprising (a) a cationic resin; and (b) a capped polyisocyanate.

47. The coating composition of claim 46, wherein the cationic resin is an epoxy-amine reaction product of a bisphenol A epoxy resin with an epoxy equivalent weight of between 200 and 2000 and a primary amine, a secondary amine, or a tertiary amine.

48. The coating composition of claim 40, further comprising (a) a polyol; and (b) a polyisocyanate.

49. The coating composition of claim 40, further comprising (a) a binder; and (b) a hardener.

50. The coating composition of claim 49, wherein the hardener is an aromatic or aliphatic isocyanate and wherein the isocyanate contains a removable blocking group.

* * * * *